(12) United States Patent
Fan et al.

(10) Patent No.: US 11,950,209 B2
(45) Date of Patent: Apr. 2, 2024

(54) REUSE OF CONTROL RESOURCES FOR DATA TRANSMISSION

(71) Applicant: Nokia Technologies Oy, Espoo (FI)

(72) Inventors: Dongsheng Fan, Nanjing (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 17/309,962

(22) PCT Filed: Jan. 10, 2019

(86) PCT No.: PCT/CN2019/071144
§ 371 (c)(1),
(2) Date: Jul. 6, 2021

(87) PCT Pub. No.: WO2020/142982
PCT Pub. Date: Jul. 16, 2020

(65) Prior Publication Data
US 2022/0078752 A1 Mar. 10, 2022

(51) Int. Cl.
*H04W 72/02* (2009.01)
*H04W 72/04* (2023.01)
(Continued)

(52) U.S. Cl.
CPC ....... *H04W 72/02* (2013.01); *H04W 72/0446* (2013.01); *H04W 72/0453* (2013.01); *H04W 72/23* (2023.01); *H04W 72/56* (2023.01)

(58) Field of Classification Search
None
See application file for complete search history.

(56) References Cited

U.S. PATENT DOCUMENTS

| 2012/0042076 A1* | 2/2012 | Kawa ................. G06F 9/50 709/226 |
| 2015/0103715 A1 | 4/2015 | Chen et al. |

(Continued)

FOREIGN PATENT DOCUMENTS

| CN | 106716903 A | 5/2017 |
| CN | 107659994 A | 2/2018 |

(Continued)

OTHER PUBLICATIONS

Office action received for corresponding Chinese Patent Application No. 201980088756.7, dated May 30, 2023, 8 pages of office action and no page of translation available.

(Continued)

*Primary Examiner* — Hong Shao
(74) *Attorney, Agent, or Firm* — Harrington & Smith

(57) ABSTRACT

Example embodiments of the present disclosure relate to a device, method, apparatus and computer readable storage medium for reusing control resources for data transmission. In example embodiments, if downlink data is to be transmitted to a terminal device, a network device determines a control resource set associated with the terminal device in a control resource region. The network device selects, from the control resource set, localized control resources for control information associated with the downlink data, and selects data resources for the downlink data in the control resource region and a data resource region. The network device transmits the control information to the terminal device by using the localized control resources, and transmits the downlink data to the terminal device by using the data resources.

19 Claims, 14 Drawing Sheets

(51) Int. Cl.
H04W 72/0446 (2023.01)
H04W 72/0453 (2023.01)
H04W 72/10 (2009.01)
H04W 72/23 (2023.01)
H04W 72/56 (2023.01)

(56) References Cited

U.S. PATENT DOCUMENTS

2018/0213477 A1* 7/2018 John Wilson ......... H04W 28/22
2018/0324767 A1 11/2018 Manolakos et al.

FOREIGN PATENT DOCUMENTS

| WO | 2014/067488 A1 | 5/2014 |
| WO | 2018/025185 A1 | 2/2018 |
| WO | 2018/168189 A1 | 9/2018 |

OTHER PUBLICATIONS

"Dynamic resource sharing of control and data channel", 3GPP TSG RAN WG1 NR Ad-Hoc#2, R1-1710546, Agenda: 5.1.3.1.3, Intel Corporation, Jun. 27-30, 2017, pp. 1-5.
"On Data Transmission in Control Resource Sets", 3GPP TSG RAN WG1 NR Ad-Hoc#2, R1-1711482, Agenda: 5.1.3.1.3, Ericsson, Jun. 27-30, 2017, pp. 1-6.
"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
"3rd Generation Partnership Project; Technical Specification Group Radio Access Network; NR; Physical layer procedures for data (Release 15)", 3GPP TS 38.214, V15.2.0, Jun. 2018, pp. 1-94.
"3rd Generation Partnership Project; Technical Specification Group Radio Access Network; NR; Physical channels and modulation (Release 15)", 3GPP TS 38.211, V15.3.0, Sep. 2018, pp. 1-96.
"3rd Generation Partnership Project; Technical Specification Group Radio Access Network; NR; Multiplexing and channel coding (Release 15)", 3GPP TS 38.212, V15.3.0, Sep. 2018, pp. 1-99.
"3rd Generation Partnership Project; Technical Specification Group Radio Access Network; Evolved Universal Terrestrial Radio Access (E-UTRA); Physical layer; Measurements (Release 15)", 3GPP TS 36.214, V15.2.0, Jun. 2018, pp. 1-24.
"Resource sharing between PDCCH and PDSCH in NR", 3GPP TSG-RAN WG1 #90, R1-1714098, Agenda: 6.1.3.1.3, Nokia, Aug. 21-25, 2017, 4 pages.
"Dynamic resource multiplexing between PDCCH and PDSCH", 3GPP TSG RAN WG1 Meeting #90, R1-1712185, Agenda: 6.1.3.1.3, Huawei, Aug. 21-25, 2017, 5 pages.
"Flexible reuse of DL control resources for data transmission", 3GPP TSG RAN WG1 Meeting #90, R1-1712395, Agenda: 6.1.3.1.3, CATT, Aug. 21-25, 2017, pp. 1-4.
"Dynamic resource sharing of control and data channel", 3GPP TSG RAN WG1 Meeting #90, R1-1712571, Agenda: 6.1.3.1.3, Intel Corporation, Aug. 21-25, 2017, pp. 1-5.
"Resource sharing between PDCCH and PDSCH", 3GPP TSG RAN WG1 Meeting #90, R1-1712717, Agenda: 6.1.3.1.3, AT&T, Aug. 21-25, 2017, 5 pages.
"Data Multiplexing in the Control Region", 3GPP TSG RAN WG1 Meeting #90, R1-1712881, Agenda: 6.1.3.1.3, TCL Communication, Aug. 21-25, 2017, 5 pages.
"Resource sharing between PDCCH and PDSCH", 3GPP TSG RAN WG1 Meeting #90, R1-1713001, Agenda: 6.1.3.1.3, NEC, Aug. 21-25, 2017, 4 pages.
"On the resource sharing between NR-PDCCH and NR-PDSCH", 3GPP TSG RAN WG1 Meeting #90, R1-1713056, Agenda: 6.1.3.1.3, Spreadtrum Communications, Aug. 21-25, 2017, 5 pages.
"Discussion on resource sharing between PDCCH and PDSCH", 3GPP TSG RAN WG1 Meeting #90, R1-1713169, Agenda: 6.1.3.1.3, LG Electronics, Aug. 21-25, 2017, 4 pages.
"On resource sharing between PDCCH and PDSCH", 3GPP TSG RAN WG1 Meeting #90, R1-1713271, Agenda: 6.1.3.1.3, Guangdong OPPO Mobile Telecom, Aug. 21-25, 2017, 6 pages.
"Indication of PDSCH starting position for NR", 3GPP TSG RAN WG1 #90, R1-1713329, Agenda: 6.1.3.1.3, Sharp, Aug. 21-25, 2017, pp. 1-4.
"Resource reuse for data in DL control region", 3GPP TSG RAN WG1 Meeting #90, R1-1713421, Agenda: 6.1.3.1.3, Qualcomm Incorporated, Aug. 21-25, 2017, pp. 1-2.
"Multiplexing NR-PDCCH and PDSCH", 3GPP TSG RAN WG1 Meeting #90, R1-1713615, Agenda: 6.1.3.1.3, Samsung, Aug. 21-25, 2017, pp. 1-4.
"Resource sharing between PDCCH and PDSCH", 3GPP TSG RAN WG1 Meeting #90, R1-1713677, Agenda: 6.1.3.1.3, MediaTek Inc, Aug. 21-25, 2017, pp. 1-4.
"Discussion on PDSCH start symbol indication", 3GPP TSG RAN WG1 Meeting #90, R1-1713814, Agenda: 6.1.3.1.3, ETRI, Aug. 21-25, 2017, pp. 1-4.
"Resource sharing between PDCCH and PDSCH", 3GPP TSG RAN WG1 Meeting #90, R1-1713869, Agenda: 6.1.3.1.3, Panasonic, Jun. 21-25, 2017, pp. 1-3.
"Resource sharing between PDCCH and PDSCH", 3GPP TSG RAN WG1 Meeting #90, R1-1713933, Agenda: 6.1.3.1.3, NTT Docomo Inc, Aug. 21-25, 2017, pp. 1-3.
"Dynamic resource reuse for PDSCH", 3GPP TSG RAN WG1 Meeting #90, R1-1714112, Agenda: 6.1.3.1.3, InterDigital, Inc, Aug. 21-25, 2017, pp. 1-3.
"PDSCH starting position indication for NR", 3GPP TSG RAN WG1 Meeting #90, R1-1714388, Agenda: 6.1.3.1.3, Wilus Inc, Aug. 21-25, 2017, 5 pages.
International Search Report and Written Opinion received for corresponding Patent Cooperation Treaty Application No. PCT/CN2019/071144, dated Apr. 30, 2019, 8 pages.
"NR DL Control Channel Structure", 3GPP TSG RAN WG1 NR Ad-Hoc Meeting, R1-1700257, Agenda : 5.1.3.1, ZTE, Jan. 16-20, 2017, pp. 1-6.
"On the DL Control Channel DM-RS Design for NR", 3GPP TSG-RAN WG1#NR, R1-1701010, Agenda : 5.1.3.1, Nokia, Jan. 16-20, 2017, 4 pages.
Extended European Search Report received for corresponding European Patent Application No. 19908169.6, dated Jul. 6, 2022, 10 pages.
"NR DL control channel structure", 3GPP TSG RAN WG1#89, R1-1708306, Agenda: 7.1.3.1.1, Motorola Mobility, May 15-19, 2017, pp. 1-3.
"Discussion on CORESET configuration", 3GPP TSG RAN WG1 Meeting #90, R1-1713166, Agenda: 6.1.3.1.2.1, LG Electronics, Aug. 21-25, 2017, pp. 1-7.

* cited by examiner

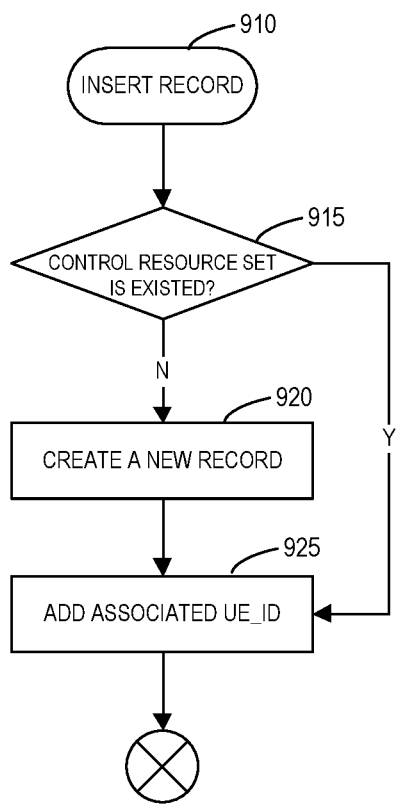
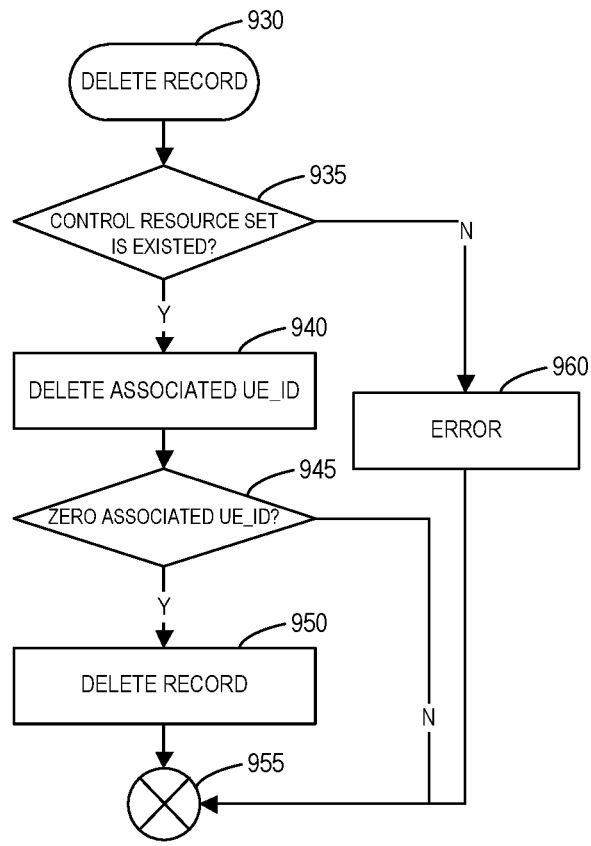
FIG. 9(a)　　　　　　　FIG. 9(b)
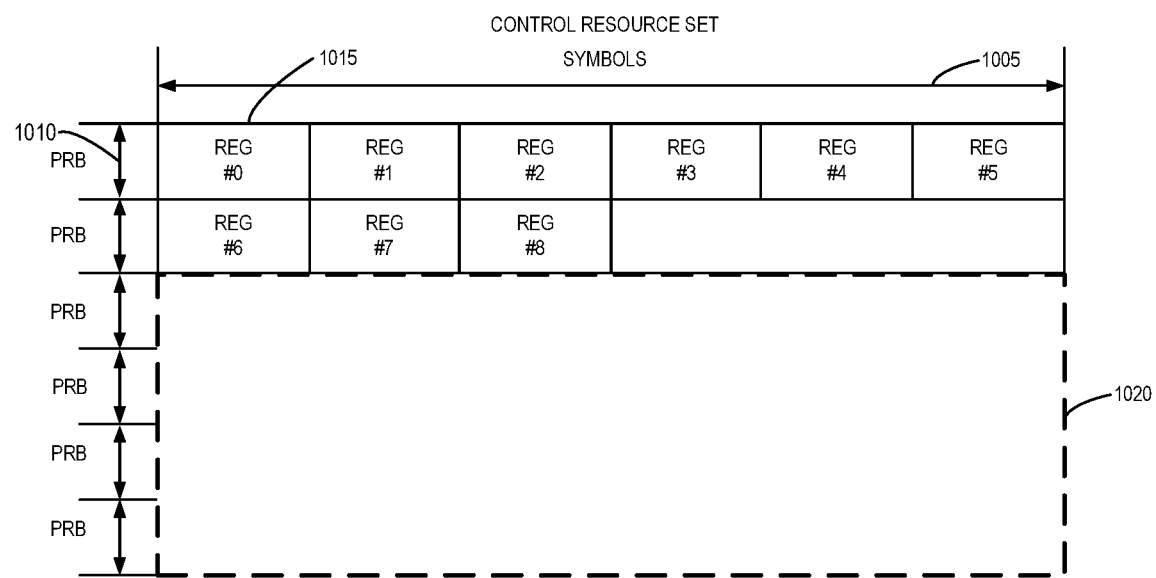
FIG. 10

REUSE OF CONTROL RESOURCES FOR DATA TRANSMISSION

RELATED APPLICATION

This application was originally filed as PCT Application No. PCT/CN2019/071144, filed on Jan. 10, 2019, each of which is incorporated herein by reference in its entirety.

FIELD

Example embodiments of the present disclosure generally relate to the field of communications, and in particular, to a device, method, apparatus and computer readable storage medium for reusing control resources for data transmission.

BACKGROUND

In the fourth generation (4G) or Long Term Evolution (LTE) system, time duration of Physical Downlink Control Channels (PDCCHs) is known by all user equipment (UEs). This time duration typically occupies the first 1 to 4 symbols across a system bandwidth (BW), which is indicated by a Control Format Indicator (CFI) broadcast in a Physical control format indicator channel (PCFICH) every Transmission Time Interval (TTI). The other symbols across the system bandwidth are used for Physical Downlink Shared Channels (PDSCHs).

In the fifth generation (5G) New Radio (NR), division of control resources and data resources is more flexible in the system bandwidth. The control resources comprise at least one UE-specific control resource set configured for the individual UEs and a common control resource set configured for all the UEs. The symbols and subcarriers occupied by the control resources are dynamically allocated in a time domain and a frequency domain. Typically, control resource sets occupy a small part of the bandwidth.

Physical resource sharing between the PDCCHs and the PDSCHs is proposed for 5G NR. Many agreements for this physical resource sharing are reached from vendors and service providers, but some key capabilities still remain FFS (for further study).

SUMMARY

In general, example embodiments of the present disclosure provide a device, method, apparatus and computer readable storage medium for reusing control resources for data transmission.

In a first aspect, a device is provided comprising at least one processor and at least one memory including computer program code. The at least one memory and the computer program code are configured to, with the at least one processor, cause the device to in response to downlink data to be transmitted to a terminal device, determine, at a network device, a control resource set associated with the terminal device in a control resource region. The device is caused to select, from the control resource set, localized control resources for control information associated with the downlink data and select data resources for the downlink data in the control resource region and a data resource region. The device is further caused to transmit the control information to the terminal device by using the localized control resources and transmit the downlink data to the terminal device by using the data resources.

In some example embodiments, the control resource set may be determined by searching a database for a record indicating the association of the control resource set and the terminal device. In some example embodiments, if the terminal device attaches to the network device, the control resource set may be associated with the terminal device, and an indication of the association of the control resource set and the terminal device may be added in the record. In some example embodiments, if the terminal device detaches from the network device, the indication of the association of the control resource set and the terminal device may be removed from the record.

In some example embodiments, it may be determined, based on at least one of a data type and a priority associated with the downlink data, whether the downlink data is allowed to be transmitted in the control resource set. If the downlink data is allowed to be transmitted in the control resource set, the data resources may be selected in the control resource set.

In some example embodiments, when selecting the data resources, a default data resource block for the downlink data may be selected in both the control resource region and the data resource region. Resources in the default data resource block may be more than the data resources. Further, at least one skipped part of the default data resource block may be determined based on used resources in the default data resource block, and the data resources may be determined from the default data resource block by excluding the at least one skipped parts of the default data resource block.

In some example embodiments, the at least one skipped part of the default data resource block may be indicated to the terminal device by dedicated control information specific to the terminal device. In some example embodiments, at least one of frequency domain resource assignment and time domain resource assignment of the at least one skipped part of the default data resource block may be indicated to the terminal device.

In a second aspect, a method is provided. In the method, if downlink data is to be transmitted to a terminal device, a network device determines a control resource set associated with the terminal device in a control resource region. The network device selects, from the control resource set, localized control resources for control information associated with the downlink data, and selects data resources for the downlink data in the control resource region and a data resource region. The network device transmits the control information to the terminal device by using the localized control resources, and transmits the downlink data to the terminal device by using the data resources.

In a third aspect, there is provided an apparatus comprising means for performing the method according to the second aspect.

In a fourth aspect, there is provided a computer readable storage medium that stores a computer program thereon. The computer program, when executed by a processor of a device, causes the device to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 9(a) illustrates a flow chart of an example process for inserting the record of the control resource set in accordance with some example embodiments of the present disclosure;

FIG. 9(b) illustrates a flow chart of an example process for deleting the record of the control resource set in accordance with some example embodiments of the present disclosure;

FIG. 10 illustrates example resource configuration in the control resource set according to some example embodiments of the present disclosure;

Throughout the drawings, the same or similar reference numerals represent the same or similar element.

DETAILED DESCRIPTION

Figure 1:
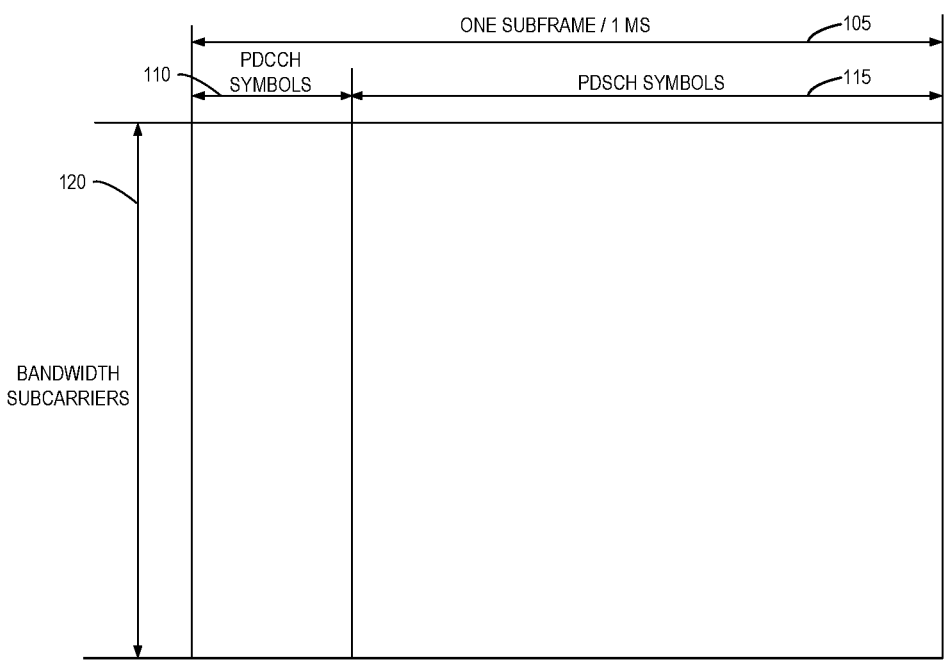
FIG. 1 illustrates a conventional example of 4G or LTE downlink resource configuration.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device capable of providing services to a terminal device in a communication network. The network device may include an access network device via which the terminal device can access the communication network. Examples of the access network device include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

The network device may also include a core network device capable of communicating with the access network device and providing services to the terminal device in a core network. As an example, the core network device may include Mobile Switching Centers (MSCs), MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, user equipment (UE) such as smart phones, wireless-enabled tablet computers, laptop-embedded equipment (LEE), laptop-mounted equipment (LME), any wireless-enabled devices, any industry sensors/machines/robotics, and/or wireless customer-premises equipment (CPE). For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In the 4G or LTE system, across the system bandwidth, the time duration of the PDCCHs typically occupies the first 1 to 4 symbols, and the other symbols are used for the PDSCHs. FIG. 1 shows a conventional example of 4G or LTE downlink resource configuration. As shown, in one subframe 105 of 1 ms, the first several symbols are PDCCH symbols 110 and the following symbols are PDSCH symbols 115 across subcarriers in a system bandwidth 120.

In 5G NR, at least one UE-specific control resource set will be configured for each UE in addition to a common control resource set which can be obtained from a Master Information Block (MIB) or a System Information Block (SIB). The time duration of the UE-specific control resource set is configured by dedicated Radio Resource Control (RRC) signaling and may be different between UEs.

Figure 2:
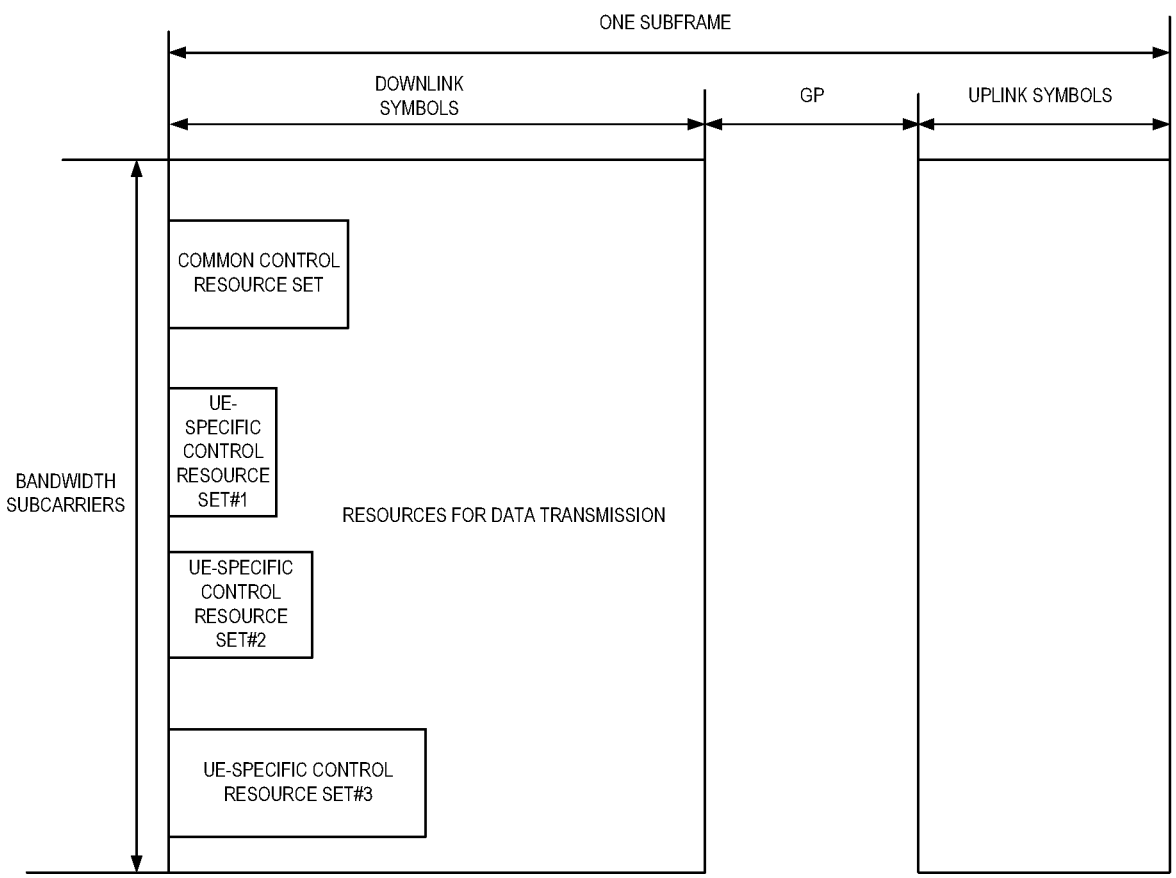
FIG. 2 illustrates a conventional example of resource configuration of 5G NR in downlink and uplink.

FIG. 2 shows a conventional example of resource configuration of 5G NR in downlink and uplink. In this example, the control resource sets in downlink occupy a small part of the bandwidth in the frequency domain and the dynamic number of symbols in the time domain. NR downlink data can use all the resources except for control resources used for Dedicated Control Information (DCI), including common DCI and UE-specific DCI, so as to achieve high frequency efficiency.

In order to improve the system efficiency, physical resource sharing between the PDCCHs and the PDSCHs is proposed for 5G NR.

The inventors notice that there is still a problem of how to allocate resources in a control resource region for data transmission. For example, it is whether and how much resources are available in the control resource region, what type of data can be allocated into the control resource region.

There is a further problem of how to indicate the starting positions of the data resources that will overlap with the control resource sets.

Example embodiments of the present disclosure provide a novel scheme of reusing control resources for data transmission to manage reusable resources in a control resource region. With this scheme, if there is downlink data to be transmitted to a terminal device, a network device determines a control resource set associated with the terminal device in a control resource region. The network device selects localized control resources for control information associated with the downlink data (for example, DCI) from the control resource set. The network device further selects data resources for the downlink data in the control resource region and a data resource region. Then, the network device transmits the control information and the downlink data using the selected control and data resources, respectively.

The management of reusable control resources is a key challenge for PDCCH and PDSCH sharing in 5G NR. According to example embodiments of the present disclosure, reusable resources in the control resource region may be allocated when the network device counters, allocates, and manages resources during cell setup, attachment and detachment of the terminal device, and data transmissions, for example. The reusable resources can be used by one or multiple terminal devices. As such, control resources may be reused for data transmission effectively and efficiently.

Figure 3:
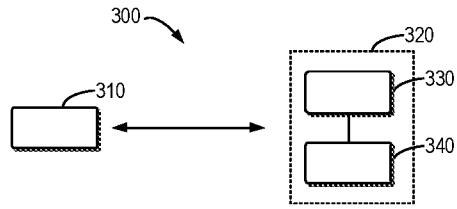
FIG. 3 illustrates an example environment in which example embodiments of the present disclosure can be implemented.

FIG. 3 shows an example environment 300 in which example embodiments of the present disclosure can be implemented. The environment 300, which is a part of a communication network, includes a terminal device 310 and a network device 320. It is to be understood that the numbers of terminal devices and network devices are shown in FIG. 3 only for the purpose of illustration, without suggesting any limitation to the scope of the present disclosure. The environment 100 may include any suitable number of terminal devices and network devices.

The terminal device 310 may communicate with the network device 320 or with another terminal device (not shown) directly or via the network device 320. The communication may follow any suitable communication standards or protocols such as Universal Mobile Telecommunications System (UMTS), Long Term Evolution (LTE), LTE-Advanced (LTE-A), evolved Long Term Evolution (eLTE), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), Narrow Band Internet of thing (NB-IoT), and ultra-reliable low latency communication (URLLC) technologies.

As shown, the network device 320 may comprise a downlink scheduler 330 for scheduling downlink control and data resources, and a database manager 340 for managing database. The downlink scheduler 330 is connected and exchanges with the database manager 340. The downlink scheduler 330 and the database manager 340 are functionality entities or modules in the network device 320. These functionality entities or modules may be implemented by a single physical entity or different physical entities. The network device 320 may comprise any other suitable functionality entities as needed.

In some example embodiments, the database manager 340 may manage the database containing record items or entries related to control resource configuration of the network device 320. The usage of control resources may be dynamically recorded in the database for the network device 320 to manage the overall reusable resources.

It is to be understood that the maintenance or management of the database by the database manager 330 within the network device 320 is only illustrative but not limited. In some other example embodiments, the environment 300 may comprise a server or device which is separate from or outside of the network device 320 for maintaining or managing the database which may be accessed by the network device 320. The network device 320 can communicate with the server or device and have access to the database.

In the environment 300, the network device 320 maintains a control resource region and a data resource region. The control resource region may comprise control resources for control information transmission, and the data resource region may comprise data resources for data transmission. The resources may comprise time, frequency and/or code resources.

In various example embodiments of the present disclosure, at least a part of the control resource region can be reused for data transmission. For control information transmission, the network device 320 selects localized control resources from a control resource set, to improve re-usage of the control resources for the data transmission. Moreover, the localization of the control resources may reduce the complexity of data resource indications and thereby reduce signaling overhead.

Figure 4:
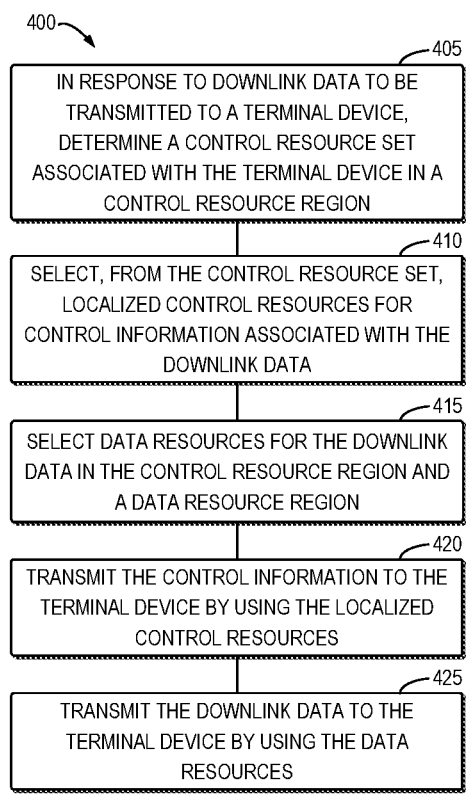
FIG. 4 illustrates a flowchart of an example method in accordance with some example embodiments of the present disclosure.

FIG. 4 shows a flowchart of an example method 400 in accordance with some example embodiments of the present disclosure. The method 400 can be implemented at the network device 320 as shown in FIG. 3. For the purpose of discussion, the method 400 will be described with reference to FIG. 3.

At block 405, if there is downlink data to be transmitted to the terminal device 310, the network device 320 selects a control resource set associated with the terminal device 320 in a control resource region. The control information may comprise common control information, such as common DCI, and control information specific to the terminal device 310, such as UE-specific DCI. Accordingly, the control resource set may comprise a common control resource set and a UE-specific control resource set.

Figure 5:
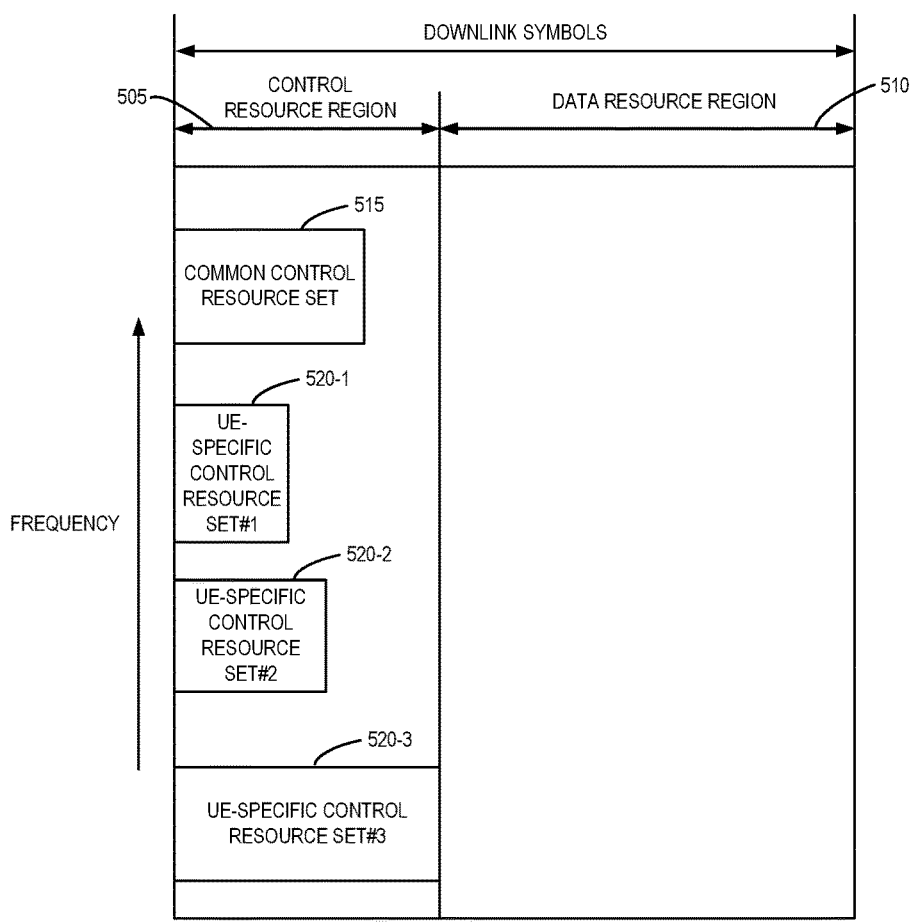
FIG. 5 illustrates example resource configuration according to some example embodiments of the present disclosure.

FIG. 5 shows example resource configuration according to some example embodiments of the present disclosure. As shown in FIG. 5, the network device 320 maintains a control resource region 505 and a data resource region 510. In the control resource region 505, a common control resource set 515 is allocated for common control information for all the UEs served by the network device 320. The common control resource set 515 may be allocated when cell setup or in other cases for example that failure occurs.

In the control resource region 505, three UE-specific control resource sets 520-1, 520-2 and 520-3 (collectively referred to as a UE-specific control resource set 520), labeled as UE-specific Control Resource Set #1, UE-specific Control Resource Set #2 and UE-specific Control Resource Set #3, are allocated to different terminal devices for control information specific to these terminal devices, such as UE-specific DCI. These resources are dedicated for the individual terminal devices. It is to be understood the number of UE-specific control resource sets 520 are shown in FIG. 5 only for the purpose of illustration without suggesting any limitation. Any number of UE-specific control resource sets 520 may be possible in implementations.

The UE-specific control resource sets 520 may be allocated during attachment of the respective terminal devices to the network device 320. The UE-specific control resource sets 520 may be indicated by Radio Resource Control (RRC) signaling to the individual terminal devices so that each terminal device knows its own control resources. One UE-specific control resource set 520 may be used for one or more terminal devices. One terminal device may be assigned to one or more UE-specific control resource sets 520.

In this example, as shown, all the control resource sets 515 and 520 start from the first symbol in a time domain to further decrease the complexity of the resource configuration. In implementations, the control resource sets 515 and 520 may be configured in any suitable positions in the control resource region 505.

At least a part of the control resource region 505 may be reused for data transmission. For example, two types of resources in the control resource region 505 may be reusable for data transmission, where one type labeled as Type #1 is non-configured resources, and the other type labeled as Type #2 is configured resource, but not used for common or UE-specific control information. The network device 320 may select resources for data transmission from the two types of resources.

For example, in addition to the non-configured resources in the control resource region 505, the UE-specific control resource sets 520 may be reusable for data transmission when the resources are not scheduled for the respective UEs. As another example, the common control resource set 515 may also be reused for data to further improve resource utilization and efficiency.

In some example embodiments, the network device 320 may maintain a database (for example, managed by the database manager 340 as shown in FIG. 3) for storing information related to the configured control resource sets 515 and 520. For example, the database contains records or record items or entries related to the configured control resource sets 515 and 520. Each control resource set has one unique record. In this example, when determining the control resource set associated with the terminal device 310, the network device 320 may determine the control resource set by searching the database for a record indicating the association of the control resource set 515 or 520 and the terminal device 310.

Figure 6:
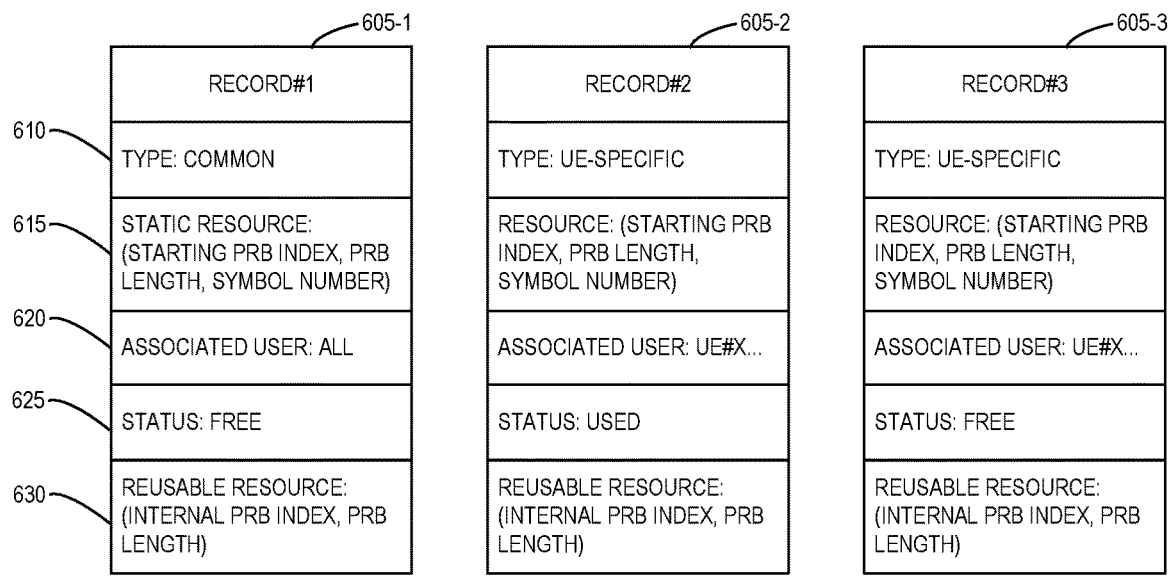
FIG. 6 illustrates an example structure of a record for the control resource sets according to some example embodiments of the present disclosure.

FIG. 6 shows an example structure of a record for the control resource sets according to some example embodiments of the present disclosure. In this example, three records 605-1, 605-2 and 605-3 (collectively or individually referred to as a record 605), labeled as Record #1, Record #2 and Record #3, are stored in the database for example in a form of a table to identify the respective control resource sets 515 and 520. It is to be understood that three records 605 are shown in FIG. 6 only for the purpose of illustration without suggesting any limitation. The number of records depends on the number of control resource sets configured by the network device 320.

The record 605 involves many fields, including a "Type" field 610, a "Status Resource" field 615, an "Associated User" field 620, a "Status" field 625 and a "Reusable Resource" field 630.

The notes of these fields are illustrated in Table 1.

TABLE 1

| Field | Notes |
|---|---|
| Type | common or UE-specific control resource set |
| Static Resource | time and frequency resources for this control resource set |
| Associated User | UEs whose DCI can be mapped on this control resource set |
| Status | If at least one DCI is mapped, it is USED; others, it is FREE. |
| Reusable Resource | It indicates the reusable resource for data transmission within this control resource set; if there is no DCI mapped, it is equal to "Static Resource", means all resource is reusable; If there is DCI mapped, and CCE/REG is distributed, it is EMPTY, means no resource is reusable; If there is DCI mapped, and CCE/REG is localized, it is resource which is not used for DCI and starting from the first symbol. |

As shown, the "Type" field 610 indicates the type of control resource set corresponding to the record 605. As indicated by the "Type" field 610, the record 605-1 corresponds to the common control resource set 515, and the records 605-2 and 605-3 correspond to the UE-specific control resource sets 520. In addition, the "Associated User" field 620 records identifiers (IDs) of the terminal devices (such as UE IDs) associated with the corresponding control resource set. The association of the control resource set and the terminal device 310 is indicated by the "Associated User" field 620. Accordingly, with the "Associated User" field 620, the association of the control resource sets and the terminal devices can be determined.

The indication of the association of the control resource set and the terminal device 310 may be added in the record for the control resource set when the terminal device 310 attaches to the network device 320. For example, upon the attachment, the network device 320 may associate the control resource set with the terminal device 310 and add the indication of this association (for example, the ID of the terminal device 310) in the record. Further, if the terminal device 310 detaches from the network device 320, the network device 320 may remove this indication.

It is to be understood that the above fields are illustrative but not limited. It is unnecessary to contain all of these fields in the record 605. Further, any other suitable fields may be contained in the record 605 to identify the corresponding control resource set.

The record 605 may be updated dynamically in the database. For example, the record 605 be created or inserted in the database when the corresponding control resource 525 or 520 is configured. If a control resource set 515 or 520 is deleted, the corresponding record 605 may be deleted from the database. Example processes for updating the records 605 in the database will be discussed below with reference to FIGS. 7 and 8.

Figure 7:
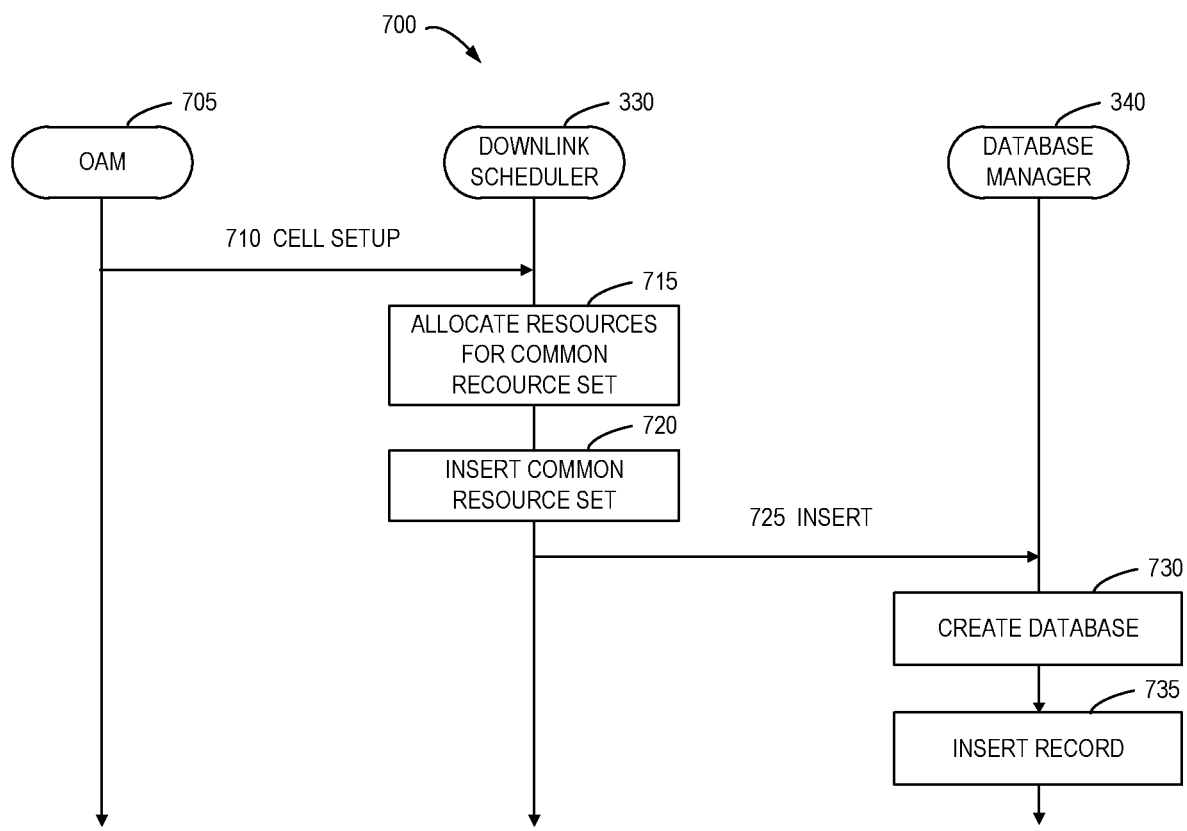
FIG. 7 illustrates an example database operation process during cell setup in accordance with some example embodiments of the present disclosure.

FIG. 7 shows an example database operation process 700 during cell setup in accordance with some example embodiments of the present disclosure. As shown, an Operations Administration and Maintenance (OAM) 705 sends (710) a cell setup request to the downlink scheduler 330. As an example, the OAM 705 may be an internal functionality entity of the network device 320 having a function of initiating cell setup. As another example, the OAM 705 may be a separate device maintained by a network operator.

Based on the cell setup request from the OAM 705, the downlink scheduler 330 allocates (715) resources for a common control resource set 515. The downlink scheduler 330 inserts (720) the common control resource set 515 into the control resource region 505 and sends (725) an insertion request to the database manager 340. The database manager 340 creates (730) a database for the cell to record the control resource configuration. The database manager 340 inserts (735) a record 605 of the common control resource set 515 into the database.

As shown, the database may be created at the time of cell setup. After resources are allocated for the common control resource set, the corresponding record may be inserted into the database.

Figure 8:
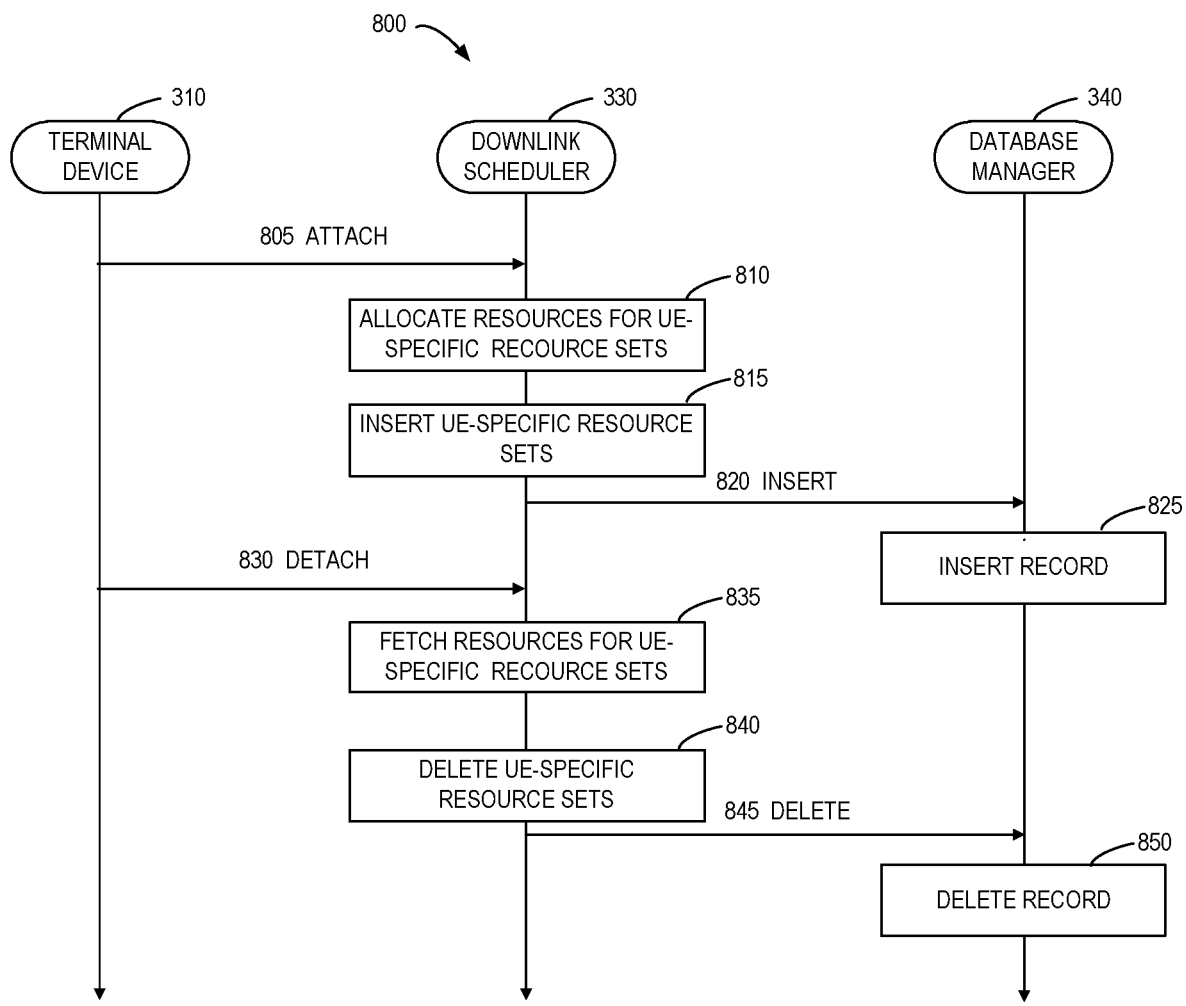
FIG. 8 illustrates an example database operation process during attachment and detachment procedures in accordance with some example embodiments of the present disclosure.

FIG. 8 shows an example database operation process 800 during attachment and detachment procedures in accordance with some example embodiments of the present disclosure. As shown, when the terminal device 310 sends (805) an attachment request, the downlink scheduler 330 allocates (810) resources for one or more UE-specific control resource sets 520 to the terminal device 310 and inserts (815) the UE-specific control resource sets 520 into the control resource region 505. The downlink scheduler 330 sends (820) an insertion request to the database manager 340. The database manager 340 inserts (825) a record 605 of the UE-specific control resource set 520 into the database.

When the terminal device 310 sends (830) a detachment request to the network device 320, the downlink scheduler 330 fetches (835) resources from the associated UE-specific control resource set 520 and deletes (840) the associated UE-specific control resource set 520 in the control resource region 505. Then, the downlink scheduler 330 sends (845) a deletion request to the database manager 340. The database manager 340 deletes (850) the record 605 of the UE-specific control resource set 520.

As shown, during the attachment procedure of the terminal device 310, the associated UE-specific control resource set may be allocated to the terminal device 310, and the corresponding record 605 may be inserted into the database. When the terminal device 310 detaches from the cell, the associated UE-specific control resource set may be deleted, and the record 605 may be removed from the database.

In some example embodiments, if the control resource set is used for more terminal devices, the record 605 may be updated by adding and removing the association with the terminal device 310. For example, in the example embodiments where the "Associated User" field 620 in the record 605 is used to record the ID of the associated terminal devices, the ID of the terminal device 310 may be added into this field during the attachment procedure and removed from this field during the detachment procedure.

Example processes for inserting and deleting the record 605 of the control resource set as shown in FIG. 8 will be discussed below with reference to FIGS. 9(a) and 9(b).

FIG. 9(a) shows a flow chart of an example process for inserting the record 605 of the control resource set in accordance with some example embodiments of the present disclosure. As shown, when deciding (910) to insert the record 605, it is determined (915) whether the control resource set is existed. If the control resource set is not existed, a new record is created (920) for the control resource set. Then, the ID of the terminal device (for example, UE_ID) 310 is added (925) into the record 605.

FIG. 9(b) shows a flow chart of an example process for deleting the record 605 of the control resource set in accordance with some example embodiments of the present disclosure. When deciding (930) to delete the record 605, it is determined (935) whether the control resource set is existed. If the control resource set is existed, the ID of the terminal device 310 (for example, UE_ID) is deleted (940) from the record 605 for the control resource set. Then, it is determined (945) whether no ID of the terminal device 310 is associated with the record 605. If yes, the record 605 is deleted (950), and then the process 930 ends (955). Otherwise, the process 930 ends (955). If it is determined (935) that the control resource set is not existed, an alert "ERROR" is presented (960).

In the case that the control resource configuration of the network device 320 is maintained by the records 605 in the database, the network device 320 may search the database for a record indicating association of a control resource set and the terminal device 310 to determine the control resource set associated with the terminal device 310. In the embodiments where the terminal device 310 is assigned to more than one control resource set, the network device 320 can first determine all of the associated control resource sets and select one of the UE-specific control resource sets for the terminal device 310. The selection of one of the UE-specific control resource sets may be based on the usage of the UE-specific control resource sets indicated by the "Reusable Resource" field 630 in the record 605, for example.

Still with reference to FIG. 4, at block 410, the network device 320 selects, from the control resource set, localized control resources for control information associated with the downlink data. The control information may be common or UE-specific DCI for indicating configuration related to the downlink data. The localization of the control resources may improve the resource utilization and efficiency.

In some example embodiments, the localized control resources may comprise a plurality of continuous resource elements. Examples of the resource elements include Control Channel Elements (CCEs) and resource element groups (REGs). In this way, the remaining resources in the control resource set may be continuous as well, which may be reused for the data transmission more effectively and efficiently.

In some example embodiments, in order to further improve the resource utilization and efficiency, the plurality of continuous resource elements may be selected starting from starting time and/or starting frequency of the control resource set. As such, more continuous control resources may be available to the data transmission.

FIG. 10 shows example resource configuration in the control resource set according to some example embodiments of the present disclosure.

As shown, the control resource set comprises multiple symbols 1005 in the time domain and several physical resource blocks (PRBs) 1010 in the frequency domain. For the control information associated with the downlink data to be transmitted to the terminal device 310, the network device 320 selects several REGs 1015 from the starting frequency (for example, the first PRB) of the control resource set. A REG may be a resource unit scheduled for the control information such as DCI. In this example, one REG comprises one PRB in the frequency domain and several symbols in the time domain. Accordingly, a bottom part 1020 of the control resource set may be reused for the data transmission.

As another example, the control resources may be selected starting from the first symbol in the control resource set. Then, a right part of the control resource set may be available for the data transmission. It is also possible that the control resources are localized in a middle part of the control resource set, and an upper part and a bottom part of the control resource set are left.

In the example embodiments where the usage of the control resource set is stored by the corresponding record 605 in the database, the network device 320 may update the record 605 after allocating the control resources. For example, the control resources may be removed from the reusable resources indicated by the "Reusable Resource" set 630 in the record 605. In some example embodiments, after the common resources have been used, the record 605 may be updated by adding the common resources back into the reusable resources.

Figure 11:
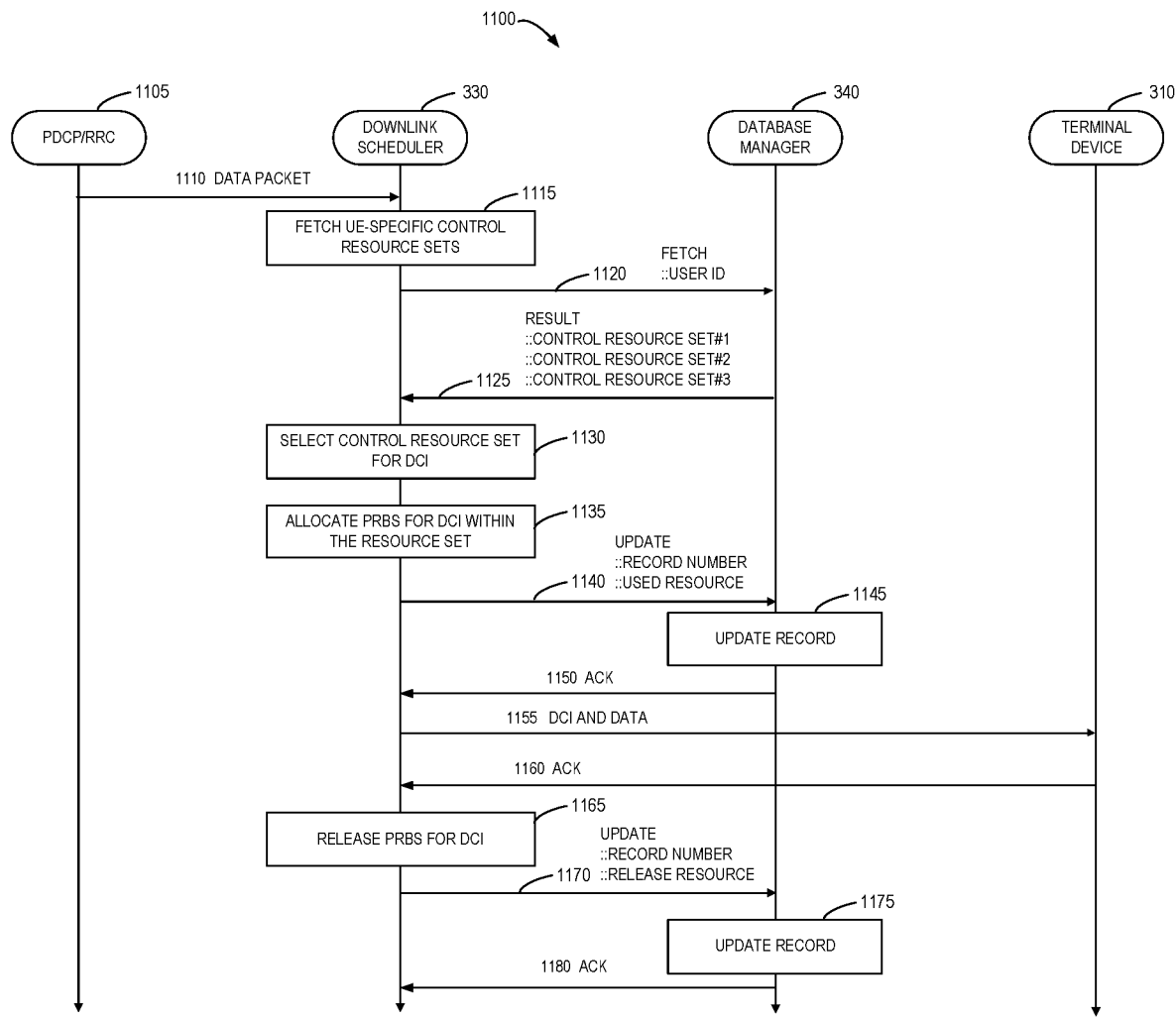
FIG. 11 illustrates an example database operation process for updating the record in accordance with some example embodiments of the present disclosure.

FIG. 11 shows an example database operation process 1100 for updating the record 605 in accordance with some example embodiments of the present disclosure.

In this example, in addition to the downlink scheduler 330 and the database manager 340, the network device 320 comprises a Packet Data Convergence Protocol (PDCP) or Radio Resource Control (RRC) entity 1105, as shown. The PDCP or RRC entity 1105 sends (1110) a data packet to the downlink scheduler 330. The downlink scheduler 330 decides (1115) to fetch the control resource sets (for example, the UE-specific control resource sets) associated with the terminal device 310, and then sends (1120) a fetching request containing the ID of the terminal device 310 to the database manager 340 to fetch the control resource sets associated with the terminal device 310. The database manager 340 returns (1125) a fetching result indicating the associated control resource sets, including Control Resource Set #1, Control Resource Set #2 and Control Resource Set #3, as shown.

The downlink scheduler 330 selects (1130) one of the control resource sets for DCI related to the data packet. Then, the downlink scheduler 330 allocates (1135) PRBs for the DCI within the selected resource set. The downlink scheduler 330 sends (1140) an update request containing the record number and the used resources to the database manager 340. The database manager 340 updates (1145) the record 605 and sends (1150) a positive acknowledgement (for example, ACK) to the downlink scheduler 330. In this way, the downlink scheduler 330 can get the reusable resources from the database, and updates records after DCI is generated.

As shown in FIG. 11, the downlink scheduler 330 transmits (1155) the DCI as well as the data packet to the terminal device 310. The terminal device 310 sends (1160) an ACK to the downlink scheduler 330. Further, the downlink scheduler 330 decides (1165) to release the PRBs for the DCI, and then sends (1170) another update request containing the record number and the released resources to the database manager 340. The database manager 340 updates (1175) the record and sends (1180) an ACK to the downlink scheduler 330.

Figure 12:
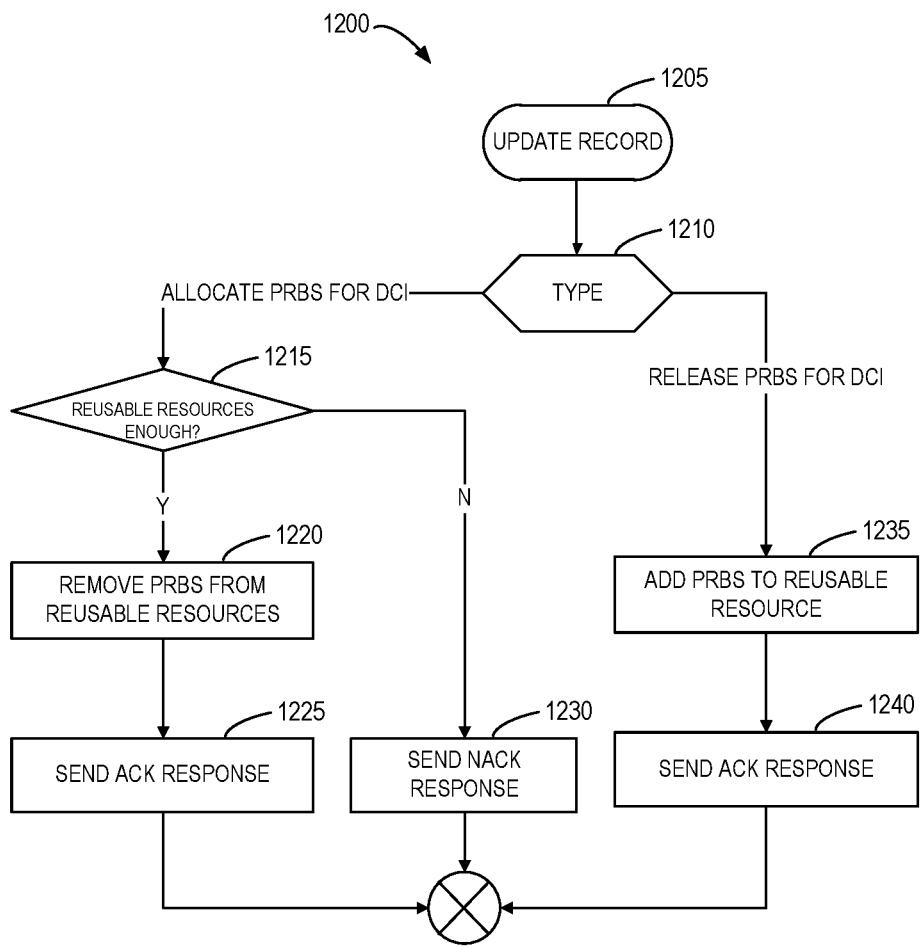
FIG. 12 illustrates a flow chart of an example process of updating the record in accordance with some example embodiments of the present disclosure.

FIG. 12 shows a flow chart of an example process 1200 of updating the record 605 in accordance with some example embodiments of the present disclosure.

When deciding (1205) to update the record 605, the type of the updating is determined (1210). If the updating is used to allocate PRBs for the DCI, it is determined (1215) whether unused resources are enough. If yes, the PRBs for the DCI are removed (1120) from the reusable resources, and then an ACK response is sent (1225). If no, a negative acknowledgement (or NACK) response is sent (1230). If it is determined (1210) that the updating of the record is used to release the PRBs for the DCI, the PRBs are added (1235) back to the reusable resources, and then an ACK response is sent (1240).

As shown in FIGS. 11 and 12, during the data transmission, the downlink scheduler 330 may select a control resource set and further select PRBs from the control resource set for DCI, including common and UE-specific DCI. Then, the reusable resources in the corresponding record 605 in the database are updated by removing the PRBs for the DCIs. When the HARQ procedure for the transmission is completed (including ACKed by UE, HARQ failure, and the like), the DCI resources may be released, and the corresponding record 605 may be updated.

Next, still with reference to FIG. 4, after the control resources are selected, the network device 320 selects data resources for the downlink data in the control resource region 505 and the data resource region 510 at block 415. For example, as shown in FIG. 5, the data resources may be selected from the reusable control resources in the control resource region 505 and the data resources in the data resource region 510. In some example embodiments, the control resources may be allocated in the control resource region 505, and the data resources may be allocated in the data resource region 510.

Figure 13:
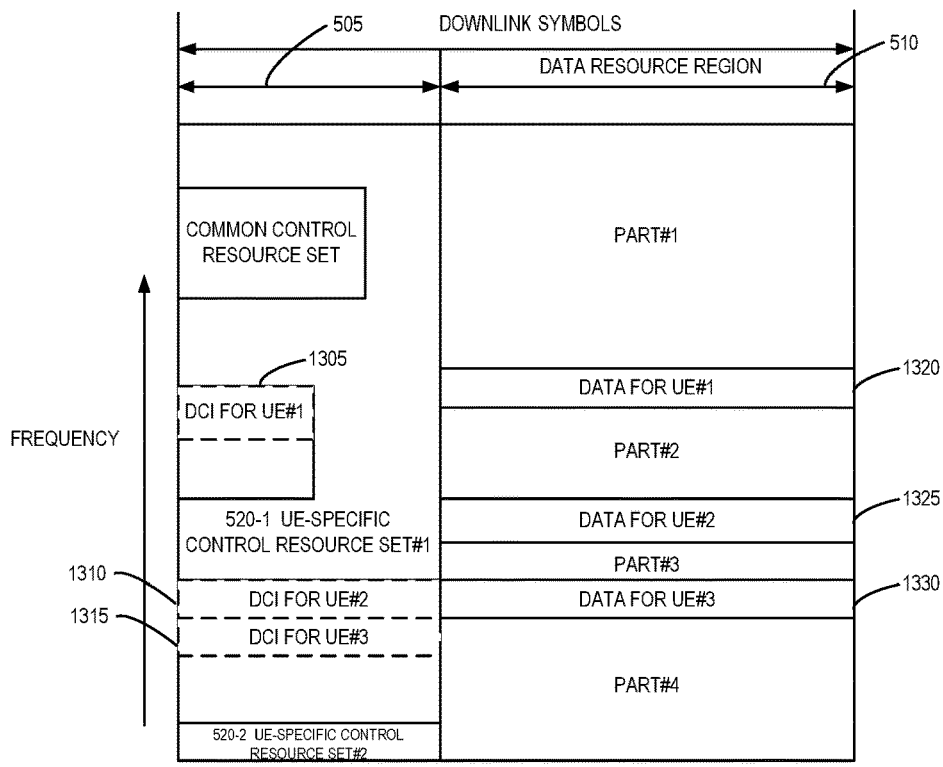
FIG. 13 illustrates example resource configuration for the control information and the data in accordance with some example embodiments of the present disclosure.

FIG. 13 shows example resource configuration for the control information and the data in accordance with some example embodiments of the present disclosure.

In this example, the control information is implemented by the UE-specific DCI. As shown, there are downlink data to be transmitted to three terminal devices, labeled as UE #1, UE #2 and UE #3, respectively. A control resource block 1305 is allocated to the DCI for UE #1 in the UE-specific control resource set 520-1, labeled as UE-specific control resource set #1. Control resource blocks 1310 and 1315 are allocated to the DCI for UE #2 and UE #3 in the UE-specific control resource set 520-2, labeled as UE-specific control resource set #2. Data resource blocks 1320, 1325 and 1330 allocated to data for UE #1, UE #2 and UE #3 are located in the data domain 510.

In some other example embodiments, in order to further reduce the resource fragment and thereby improve the resource utilization and efficiency, the data resources may be selected preferentially from the reusable control resources in the control resource region 505. The preferential use of the reusable control resources of the control resource set may depend from the priorities of the downlink data related to a service type, Quality of Experience (QoE), latency requirements and the like. The priorities may be predefined for different service criteria and policies. As an example, the policies and criteria may comprise a data type and/or a priority associated with the downlink data. Those policies and criteria may be configurable in a network so that the network device 320 can dynamically determine the downlink data with optimization usage of the control resource sets in the control resource region 505. Based on the policies and criteria, it may be determined whether the downlink data is allowed to be transmitted in the control resource set for control information.

For example, in 5G URLLC services (and mMTC services), lots of frequent and short data packets are transmitted. These short packets only use few resources but require high reliability, which is similar to DCI. Accordingly, a higher priority may be configured by the network device 320 for the short packets with the network policies and criteria. Therefore, the reuse of the control resource set may be prioritized for these packets. For example, the short packets may be scheduled in Type #2 reusable control resource (which is configured, but not used for DCIs). Thus, the resource fragments may be decreased, and more resources may be used for the high traffic service.

In some example embodiments, the data resources may be allocated in the control resource set where the control resources are selected. For example, after the control resources are selected from the control resource set, the network device 320 may determine whether reusable control resources of the control resource set are sufficient to accommodate the downlink data. If the reusable control resources are sufficient, the network device 320 selects the data resources from the control resource set. In addition, one modulation and coding scheme (MCS) may be applied to both the control information and the downlink data to further improve transmission efficiency.

Figure 14:
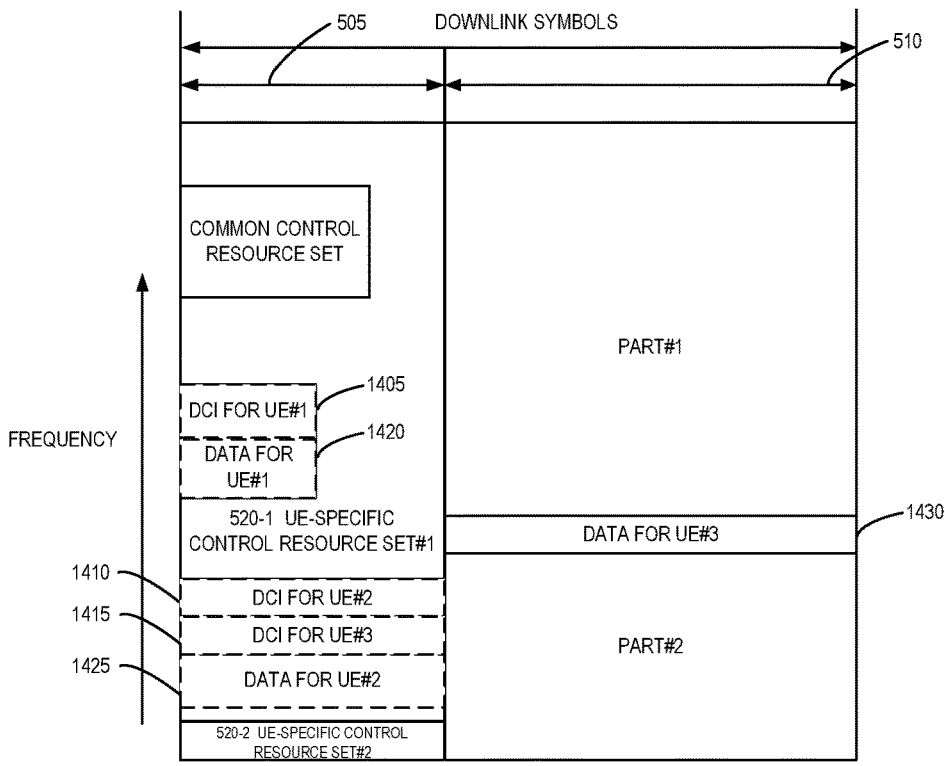
FIG. 14 illustrates example resource configuration for the control information and the data in accordance with some example embodiments of the present disclosure in accordance with some other example embodiments of the present disclosure.

FIG. 14 shows example resource configuration for the control information and the data in accordance with some example embodiments of the present disclosure in accordance with some other example embodiments of the present disclosure.

Similar to the configuration as shown in FIG. 13, control resources 1405 for the DCI of UE #1 are allocated in the UE-specific control resource set 520-1, labeled as UE-specific control set #1, and control resources 1410 and 1415 for the DCI of UE #2 and UE #3 are allocated in the UE-specific control resource set 520-2, labeled as UE-specific control set #2. Different from the configuration in FIG. 13, data resources 1420 allocated to the data for UE #1 follows the control resources for the DCI of UE #1 in the UE-specific control resource set 520-1, and data resources 1425 allocated to the data for UE #2 follows the control resources for the DCI of UE #3 in the UE-specific control resource set 520-2. Data resources 1430 are allocated to the data for UE #3 in the data resource region 510. In this case, the DCI and the data for UE #1 may use the same MCS, and the DCI for UE #2 and UE #3 and the data for UE #2 may use the same MCS.

Figure 15:
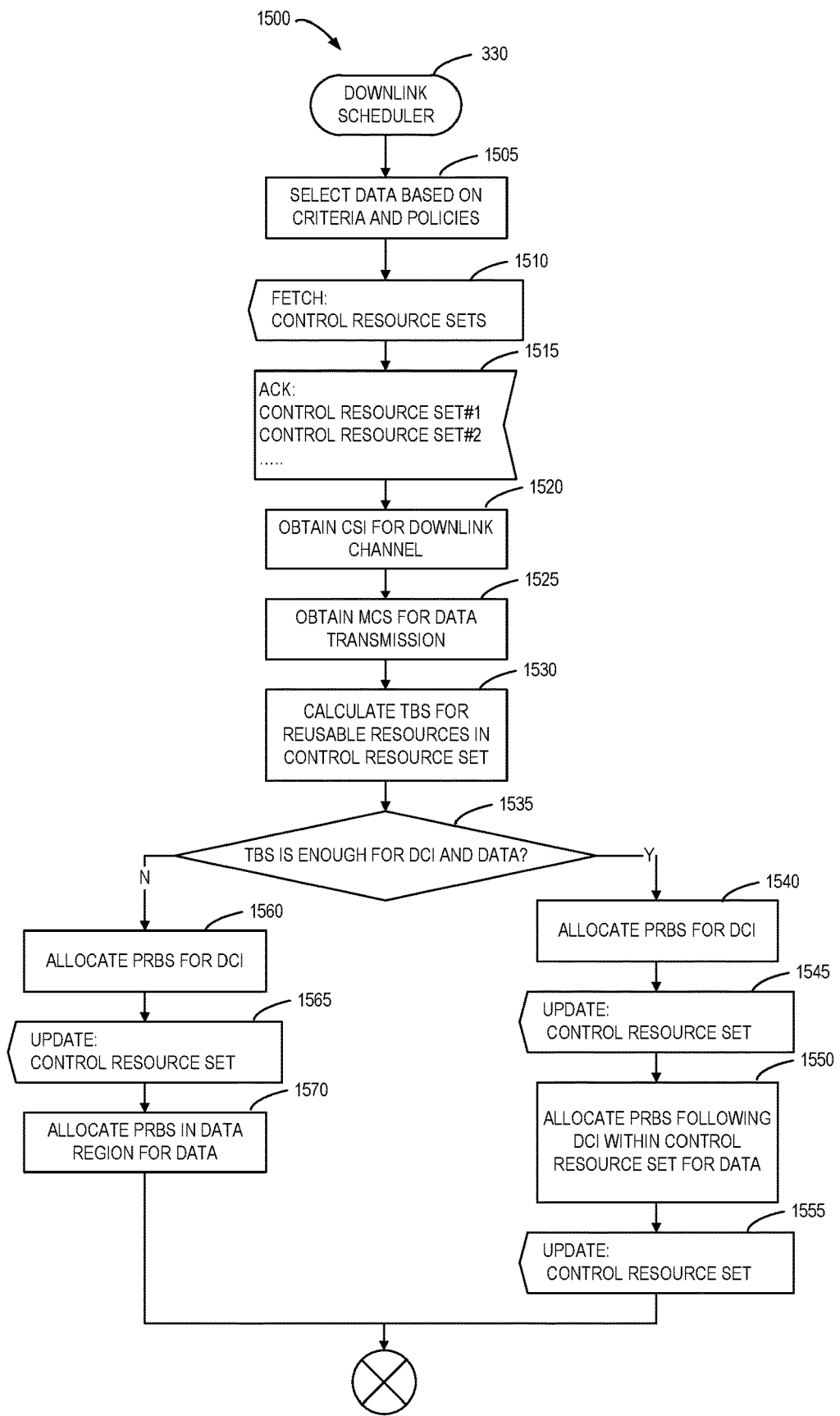
FIG. 15 illustrates a flow chart of an example process of allocating resources in accordance with some example embodiments of the present disclosure.

FIG. 15 shows a flow chart of an example process 1500 of allocating resources in accordance with some example embodiments of the present disclosure. The process 1500 can be implemented by the downlink scheduler 330.

As shown, the downlink scheduler 330 selects (1505) the downlink data to be prioritized in the reusable resources in the control resource set for the DCI based on the predefined criteria and policies. The downlink scheduler 330 fetches (1510) the control resource sets associated with the terminal device 310 from the database. Then, the downlink scheduler 330 receives (1515) an ACK response containing indications of the associated control resource sets such as Control Resource Set #1, Control Resource Set #2, and the like.

The downlink scheduler 330 obtains (1520) Channel State Information (CSI) for a downlink channel and determines (1525) a Modulation and Coding Scheme (MCS) for data transmission based on the CSI. The downlink scheduler 330 calculates (1530) an available Transmission Block Size (TBS) for reusable resources in one of the control resource set.

The downlink scheduler 330 determines (1535) whether the TBS is sufficient for both the DCI and the data. If the TBS is enough, the downlink scheduler 330 allocates (1540) PRBs for the DCI in the control resource set and then updates (1545) the reusable resources in the control resource set. Then, the downlink scheduler 330 allocates (1550) PRBs for the data following the PRBs for the DCI in the control resource set, and updates (1555) the control resource set. If the TBS is insufficient, the downlink scheduler 330 allocates (1560) PRBs for the DCI in the control resource set and updates (1565) the reusable resources in the control resource set. For the data, the downlink scheduler 330 allocates (1570) PRBs in the data resource region 510. In this way, if the reusable resources in the control resource set are enough for data transmission, the downlink scheduler 330 will decide to transmit the data following DCI in the control resource set.

In some example embodiments, the network device 320 may try to transmit data in both the data resource region 510 and reusable resources in the control resource region 505 to further increase the resource utilization and efficiency. For example, the network device 320 may select a default data resource block for the downlink data in the control resource region 505 and the data resource region 510. The default data resource block is overbooked compared to the required data resources. For example, the resources in the default data resource block may be more than the resources required for the downlink data. The overbooking may be implemented by a multiplier factor to a TBS for the data. The factor may be a customized parameter with a predetermined value larger than 1. For example, 1.1 means that 10% additional resources are overbooked. In the default data resource block, the network device 320 determines used resources to determine at least one skipped part of the default data resource block. The data resources for the downlink data may be determined from the default data resource block by removing the at least one skipped parts of the default data resource block.

Figure 16A:
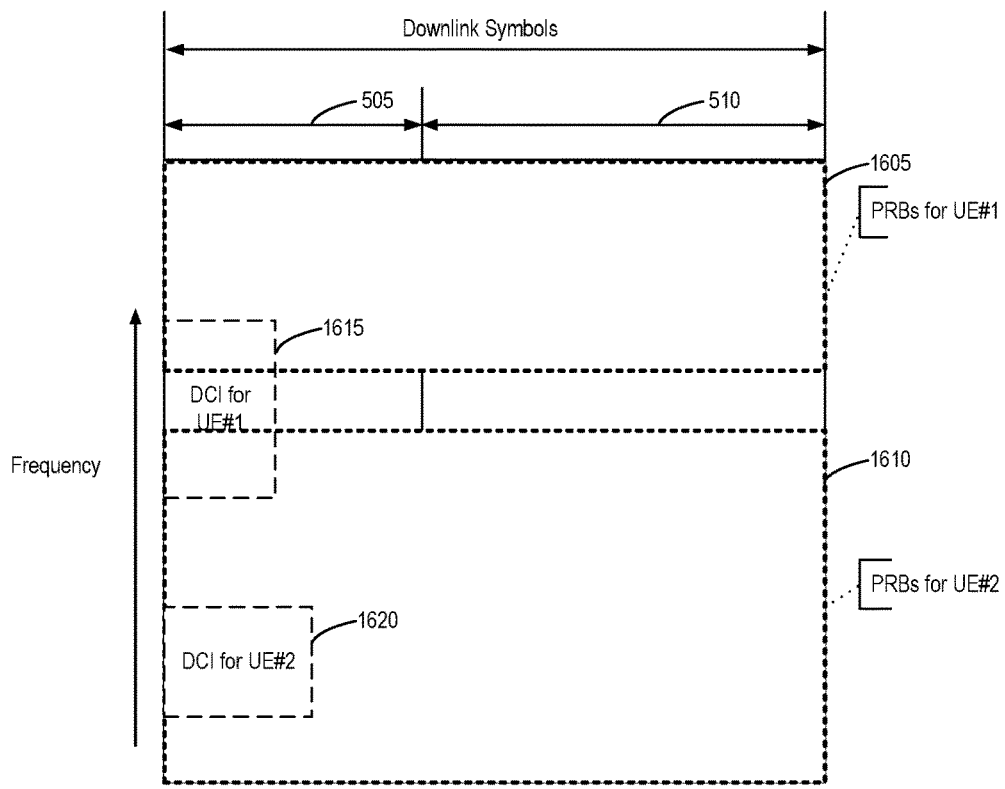
FIGS. 16(a) and 16(b) illustrate an example mechanism of overbooking the data resources in accordance with some example embodiments of the present disclosure.
Figure 16B:
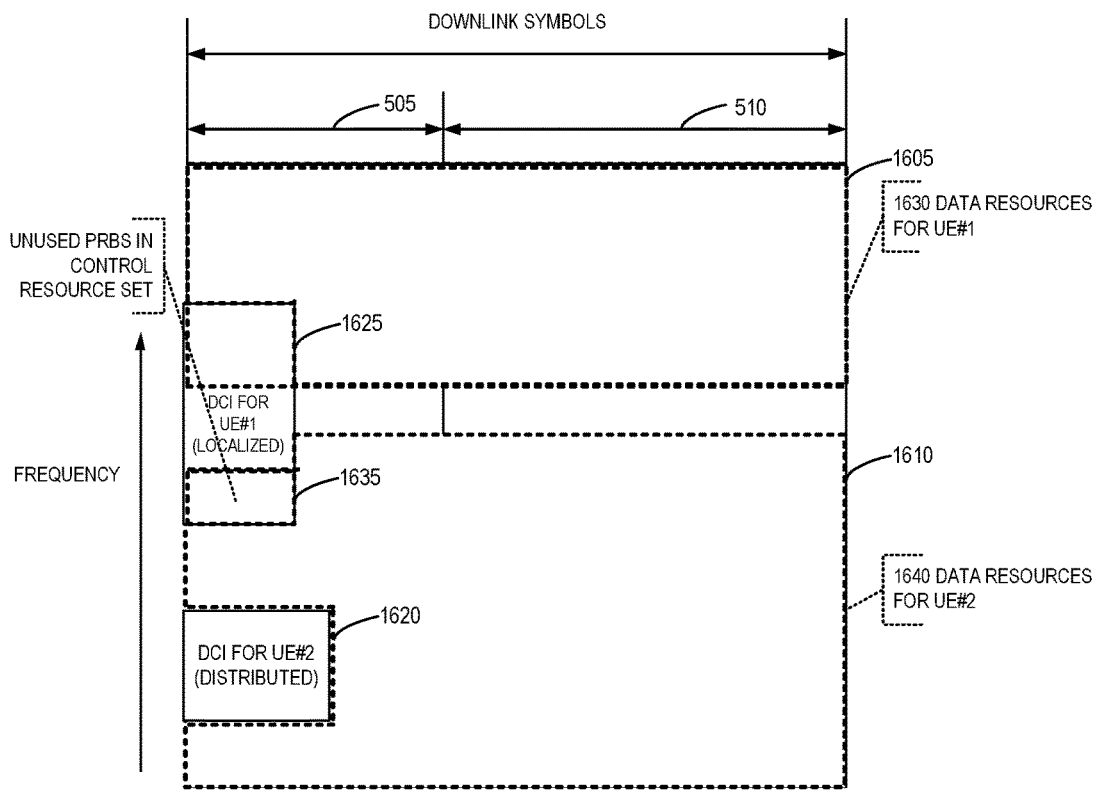

FIGS. 16(a) and 16(b) show an example mechanism of overbooking the data resources in accordance with some example embodiments of the present disclosure.

As shown in FIG. 16(a), the network device 320 first selects default data resource blocks 1605 and 1610 for the data of UE #1 and UE #2 in both the control resource region 505 and the data resource region 510. In this example, the default data resource blocks 1605 and 1610 both start from symbol #0. The default data resource block 1605 includes a part of a control resource block 1615 for DCI of UE #1. The default data resource block 1610 includes a part of the control resource block 1615 for the DCI of UE #1 and a part of a control resource block 1620 for the DCI of UE #2. Further, the network device 320 excludes the used resources (for example, resources allocated for DCIs, short data, and the like) from the default data resource blocks 1605 and 1610.

As shown in FIG. 16(b), for UE #1, the network device 320 excludes the part 1625 of the control resource block 1615 for the DCI of UE #1 from the default data resource block 1605 and determines the remaining data resources 1630 of the default data resource block 1605 for the data transmission. For UE #2, the network device 320 excludes the part 1635 of the control resource block 1615 for the DCI of UE #1 and the control resource block 1620 for the DCI of UE #2 from the default data resource block 1610 and determines the remaining data resources 1640 of the data resources 1610 for the data transmission. In this way, the data resource region 510 and the reusable resources in the control resource sets can all be used for data transmission.

The data resources may be indicated to the terminal device 310 so that the terminal device 310 may detect the downlink data. In some example embodiments, the data resources may be indicated by the DCI specific to the terminal device 310. For example, in the example embodiments where the resources are configured as shown in FIG. 14, the data resources 1415 for UE #1 have the same time duration with the control resources 1405 for the DCI of UE #1. The frequency The data resources 1420 for UE #2 has the same time duration with the control resources 1410 and 1415 for the DCI of UE #2 and UE #3. In this case, the data resources 1415 for UE #1 may be indicated by the field "Frequency domain resource assignment" in the DCI for UE #1, which is same as DCI Format1_0 and DCI Format1_1. The field "Time domain resource assignment" in the DCI for UE #1 will be reused to indicate the case that the resources for the data and the DCI have the same time duration. For example, a reserved value of the field "Time domain resource assignment" may be used to indicate this special case.

Figure 17:
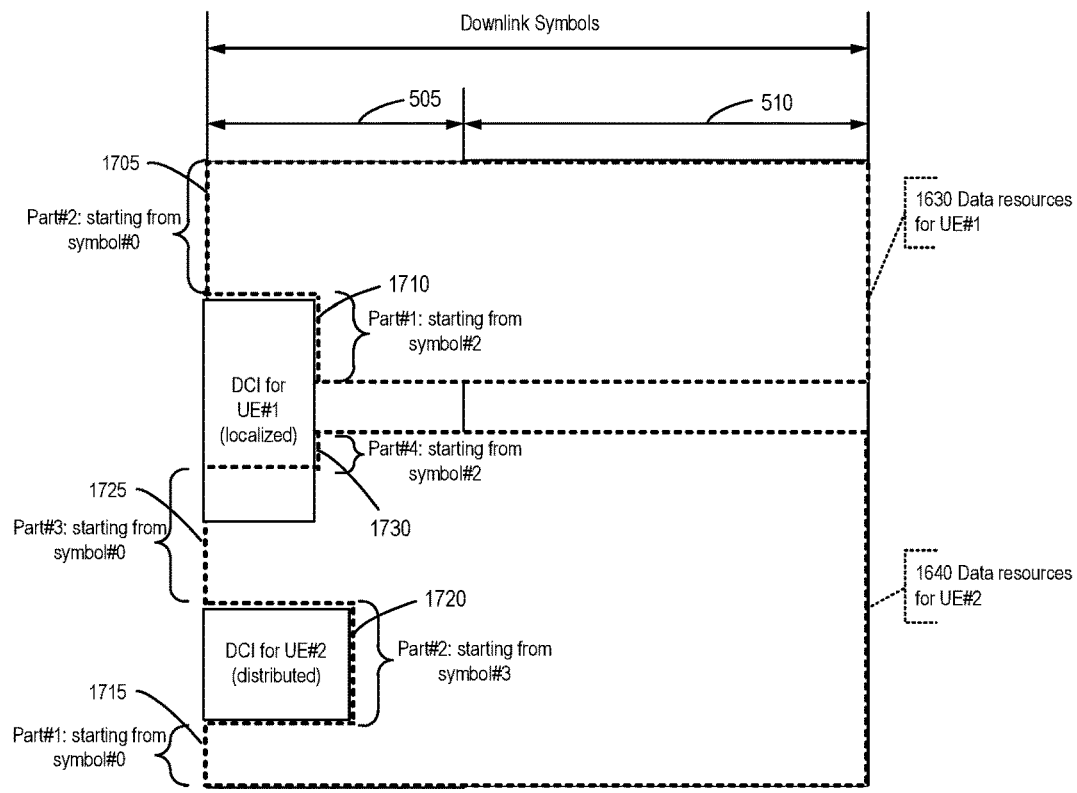
FIG. 17 illustrates an example indication of the data resources in accordance with some example embodiments of the present disclosure.

For the overbook mechanism, the network device 320 may need to indicate the locations for the skipped parts of the default data resource block. In the DCI format for 5G NR, only one time-resource field "Time domain resource assignment" is contained in the DCI. This field indicates the starting position and length in time domain for all the allocated frequency resources. With the overbook mechanism, the data resources may not be a rectangle since some parts of the data resources may be skipped. In this case, more than one starting positions of the data resources may need to be indicated as shown in FIG. 17. As shown in FIG. 17, for the data resources 1630, two starting time points 1705 and 1710 need to be indicated, labeled as Part #1 and Part #2. For the data resources 1640, four starting time points 1715, 1720, 1725 and 1730 need to be indicated, labeled as Part #1 to Part #4.

These starting positions may also be indicated by the DCI specific to the terminal device 310. The indication with the UE-specific DCI instead of common DCI or RRC signaling allows the terminal device 310 to only decode UE-specific DCI without decoding the common DCI or the RRC signal. Accordingly, the network device 320 may schedule resources dynamically and flexibly, for example, slot by slot since UE-specific control resource sets may be varied due to attach/detach procedure. As a result, RRC reconfigurations or common DCI broadcasting procedure may not be required, and the overhead may be significantly reduced.

In order to further reduce overhead, as another example, the network device 320 may indicate the skipped parts of the default data resource block, rather than a plurality of starting positions of the data resources. For example, the network device 320 may indicate the default data resource block as well as the corresponding skipped resource blocks to the terminal device 310. An example implementation of indicating the data resources will be discussed below with reference to FIG. 18.

Figure 18:
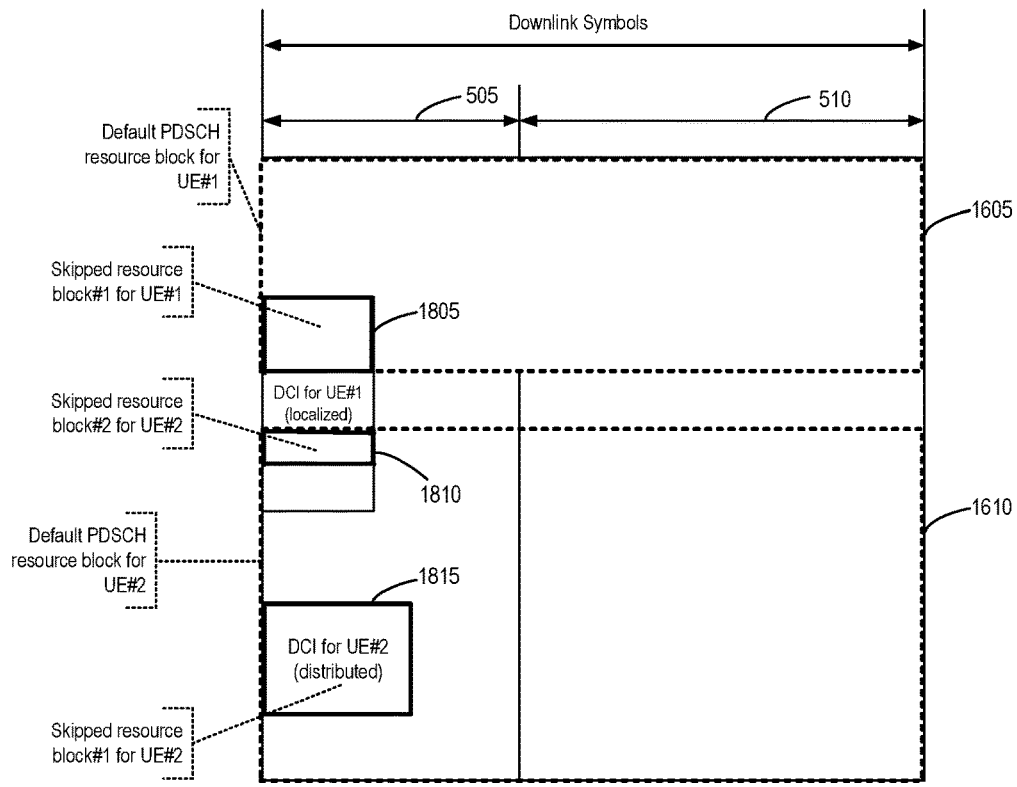
FIG. 18 illustrates an example indication of the data resources in accordance with some example embodiments of the present disclosure.

FIG. 18 shows an example indication of the data resources in accordance with some example embodiments of the present disclosure.

As shown, for UE #1, the network device 320 may indicate the default data resource block 1605 and the skipped resource block 1805. For UE #2, the network device 320 may indicate the default data resource block 1610 and the skipped resource blocks 1810 and 1815. The indications of the default data resource block and the skipped resource block may also be implemented by the UE-specific DCI. For example, the default resource block may be indicated by the fields "Frequency domain resource assignment" and "Time domain resource assignment" in DCI. The skipped resource block may be indicated using a new DCI format.

An example item structure of the new DCI format is illustrative as below.

---

Skipped Resource block#0
    Frequency domain resource assignment
    Time domain resource assignment
Skipped Resource block#1
    Frequency domain resource assignment
    Time domain resource assignment
Skipped Resource block#2
    Frequency domain resource assignment
    Time domain resource assignment

--- where:

| Field | Notes |
|---|---|
| Frequency domain resource assignment | starting PRB, and PRB length |
| Time domain resource assignment | symbol number in time domain. |

As shown, in the new DCI format, the items indicating the positions of the skipped resource blocks are added.

In some example embodiments, in order to further decrease decoding complexity, the network device 320 may set a threshold number related to the skipped parts of the default data resource block. For example, the network device 320 may set a maximum number of the skipped parts to reduce the number of additional items in the DCI. As an example, at most 3 skipped parts are supported. Thus, the DCI size may be constant, and therefore it is easy for the terminal device 310 to decode the DCI.

Next, still with reference to FIG. 4, at block 420, the network device 320 transmits the control information to the terminal device 310 by using the localized control resources. At block 425, the network device 320 transmits the downlink data to the terminal device 310 by using the data resources.

In some example embodiments, the method 400 described above with reference to FIGS. 3-18 may be performed by an apparatus comprising means for performing the respective steps of the method 400. The means may be implemented in any suitable form. For example, the means may be implemented in a circuitry or software module.

Figure 19:
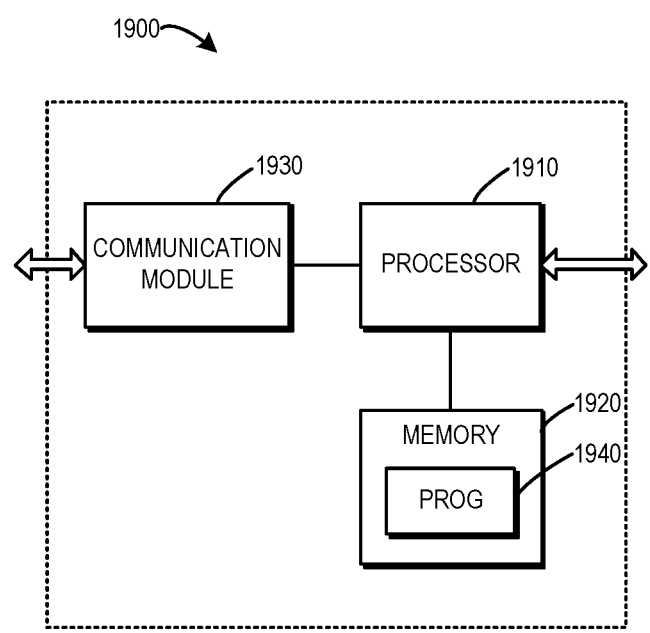
FIG. 19 is a simplified block diagram of a device that is suitable for implementing example embodiments of the present disclosure.

FIG. 19 is a simplified block diagram of a device 1900 that is suitable for implementing example embodiments of the present disclosure. The device 1900 can be implemented at or as a part of the network device 320 as shown in FIG. 3.

As shown, the device 1900 includes a processor 1910, a memory 1920 coupled to the processor 1910, a communication module 1930 coupled to the processor 1910, and a communication interface (not shown) coupled to the communication module 1930. The memory 1920 stores at least a program 1940. The communication module 1930 is for bidirectional communications, for example, via multiple antennas. The communication interface may represent any interface that is necessary for communication.

The program 1940 is assumed to include program instructions that, when executed by the associated processor 1910, enable the device 1900 to operate in accordance with the example embodiments of the present disclosure, as discussed herein with reference to FIGS. 3-18. The example embodiments herein may be implemented by computer software executable by the processor 1910 of the device 1900, or by hardware, or by a combination of software and hardware. The processor 1910 may be configured to implement various example embodiments of the present disclosure.

The memory 1920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1920 is shown in the device 1900, there may be several physically distinct memory modules in the device 1900. The processor 1910 may be of any type suitable to the local technical network, and may include one or more of general purpose computers, special purpose computers, microprocessors, digital signal processors (DSPs) and processors based on multicore processor architecture, as non-limiting examples. The device 1900 may have multiple processors, such as an application specific integrated circuit chip that is slaved in time to a clock which synchronizes the main processor.

When the device 1900 acts as the network device 320 or a part of the network device 320, the processor 1910 and the communication module 1930 may cooperate to implement the method 400 as described above with reference to FIGS. 3-18. All operations and features as described above with reference to FIGS. 3-18 are likewise applicable to the device 1900 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIGS. 3-18. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the present disclosure have been described. In addition to or as an alternative to the above, the following examples are described. The features described in any of the following examples may be utilized with any of the other examples described herein.

Example 1. a device comprising: at least one processor; and at least one memory including computer program code; the at least one memory and the computer program code configured to, with the at least one processor, cause the device to: in response to downlink data to be transmitted to a terminal device, determine, at a network device, a control resource set associated with the terminal device in a control resource region; select, from the control resource set, localized control resources for control information associated with the downlink data; select data resources for the downlink data in the control resource region and a data resource region; transmit the control information to the terminal device by using the localized control resources; and transmit the downlink data to the terminal device by using the data resources.

Example 2. the device of example 1, wherein the device is caused to determine the control resource set by: determining the control resource set by searching a database for a record indicating the association of the control resource set and the terminal device.

Example 3. the device of example 2, wherein the record is stored for the control resource set in the database.

Example 4. the device of example 2, wherein the device is further caused to: in response to attachment of the terminal device to the network device, associate the control resource set with the terminal device; and add an indication of the association of the control resource set and the terminal device in the record.

Example 5. the device of example 4, wherein the device is further caused to: in response to detachment of the terminal device from the network device, remove the indication of the association of the control resource set and the terminal device from the record.

Example 6. the device of example 2, wherein the record further indicates reusable control resources in the control resource set, and the device is further caused to: update the record by removing the localized control resources from the reusable control resources in the control resource set.

Example 7. the device of example 6, wherein the device is further caused to: in response to completion of the transmission of the downlink data, update the record by adding the localized control resources back to the reusable control resources in the control resource set.

Example 8. the device of example 1, wherein the localized control resources comprise a plurality of continuous resource elements.

Example 9. the device of example 8, wherein the plurality of continuous resource elements are selected starting from at least one of starting time and starting frequency of the control resource set.

Example 10. the device of example 1, wherein the control resource set is allocated from starting time of the control resource region.

Example 11. the device of example 1, wherein the control information is common control information, and the control resource set is a common control resource set allocated in response to cell setup.

Example 12. the device of example 1, wherein the control information is control information specific to the terminal device, and the control resource set is a control resource set allocated to the terminal device in response to attachment of the terminal device to the network device.

Example 13. the device of example 1, wherein the device is caused to select the data resources by: selecting the data resources in the control resource set.

Example 14. the device of example 1, wherein the device is caused to select the data resources in the control resource set by: determining, based on at least one of a data type and a priority associated with the downlink data, whether the downlink data is allowed to be transmitted in the control resource set; and in response to determining that the downlink data is allowed to be transmitted in the control resource set, selecting the data resources in the control resource set.

Example 15. the device of example 13 or 14, wherein a modulation and coding scheme is applied to both the control information and the downlink data.

Example 16. the device of example 13 or 14, wherein first time duration of the control resources is the same as second time duration of the data resources, or a first frequency band of the control resources is the same as a second frequency band of the data resources.

Example 17. the device of example 1, wherein the device is caused to select the data resources by: selecting a default data resource block for the downlink data in both the control resource region and the data resource region, wherein resources in the default data resource block are more than the data resources; determining at least one skipped part of the default data resource block based on used resources in the default data resource block; and determining the data resources from the default data resource block by excluding the at least one skipped parts of the default data resource block.

Example 18. the device of example 17, wherein the device is caused to select the data resources from the default data resource block by: determining whether the number of skipped parts is below a threshold number; and in response to determining that the number of skipped resource blocks is below the threshold number, selecting the data resources from the default data resource block by excluding the at least one skipped parts of the default data resource block.

Example 19. the device of example 17 or 18, wherein the device is further caused to: indicate the at least one skipped part of the default data resource block to the terminal device by dedicated control information specific to the terminal device.

Example 20. the device of example 19, wherein the device is caused to indicate the at least one skipped part of the default data resource block by: indicating at least one of frequency domain resource assignment and time domain resource assignment of the at least one skipped part of the default data resource block.

Example 21. a method comprising: in response to downlink data to be transmitted to a terminal device, determining, at a network device, a control resource set associated with the terminal device in a control resource region; selecting, from the control resource set, localized control resources for control information associated with the downlink data; selecting data resources for the downlink data in the control resource region and a data resource region; transmitting the control information to the terminal device by using the localized control resources; and transmitting the downlink data to the terminal device by using the data resources.

Example 22. the method of example 21, wherein determining the control resource set comprises: determining the control resource set by searching a database for a record indicating the association of the control resource set and the terminal device.

Example 23. the method of example 22, wherein the record is stored for the control resource set in the database.

Example 24. the method of example 22, further comprising: in response to attachment of the terminal device to the network device, associating the control resource set with the terminal device; and adding an indication of the association of the control resource set and the terminal device in the record.

Example 25. the method of example 24, further comprising: in response to detachment of the terminal device from the network device, removing the indication of the association of the control resource set and the terminal device from the record.

Example 26. the method of example 22, wherein the record further indicates reusable control resources in the control resource set, and the method further comprises: updating the record by removing the localized control resources from the reusable control resources in the control resource set.

Example 27. the method of example 26, further comprising: in response to completion of the transmission of the downlink data, updating the record by adding the localized control resources back to the reusable control resources in the control resource set.

Example 28. the method of example 21, wherein the localized control resources comprise a plurality of continuous resource elements.

Example 29. the method of example 28, wherein the plurality of continuous resource elements are selected starting from at least one of starting time and starting frequency of the control resource set.

Example 30. the method of example 21, wherein the control resource set is allocated from starting time of the control resource region.

Example 31. the method of example 21, wherein the control information is common control information, and the control resource set is a common control resource set allocated in response to cell setup.

Example 32. the method of example 21, wherein the control information is control information specific to the terminal device, and the control resource set is a control resource set allocated to the terminal device in response to attachment of the terminal device to the network device.

Example 33. the method of example 21, wherein selecting the data resources comprises: selecting the data resources in the control resource set.

Example 34. the method of example 21, wherein selecting the data resources in the control resource set comprises: determining, based on at least one of a data type and a priority associated with the downlink data, whether the downlink data is allowed to be transmitted in the control resource set; and in response to determining that the downlink data is allowed to be transmitted in the control resource set, selecting the data resources in the control resource set.

Example 35. the method of example 33 or 34, wherein a modulation and coding scheme is applied to both the control information and the downlink data.

Example 36. the method of example 33 or 34, wherein first time duration of the control resources is the same as second time duration of the data resources, or a first frequency band of the control resources is the same as a second frequency band of the data resources.

Example 37. the method of example 21, wherein selecting the data resources comprises: selecting a default data resource block for the downlink data in both the control resource region and the data resource region, wherein resources in the default data resource block are more than the data resources; determining at least one skipped part of the default data resource block based on used resources in the default data resource block; and determining the data resources from the default data resource block by excluding the at least one skipped parts of the default data resource block.

Example 38. the method of example 37, wherein selecting the data resources from the default data resource block comprises: determining whether the number of skipped parts is below a threshold number; and in response to determining that the number of skipped resource blocks is below the threshold number, selecting the data resources from the default data resource block by excluding the at least one skipped parts of the default data resource block.

Example 39. the method of example 37 or 38, further comprising: indicating the at least one skipped part of the default data resource block to the terminal device by dedicated control information specific to the terminal device.

Example 40. the method of example 39, wherein indicating the at least one skipped part of the default data resource block comprises: indicating at least one of frequency domain resource assignment and time domain resource assignment of the at least one skipped part of the default data resource block.

Example 41. an apparatus comprising: means for in response to downlink data to be transmitted to a terminal device, determining, at a network device, a control resource set associated with the terminal device in a control resource region; means for selecting, from the control resource set, localized control resources for control information associated with the downlink data; means for selecting data resources for the downlink data in the control resource region and a data resource region; means for transmitting the control information to the terminal device by using the localized control resources; and means for transmitting the downlink data to the terminal device by using the data resources.

Example 42. the apparatus of example 43, wherein the means for determining the control resource set comprises: means for determining the control resource set by searching a database for a record indicating the association of the control resource set and the terminal device.

Example 43. the apparatus of example 42, wherein the record is stored for the control resource set in the database.

Example 44. the apparatus of example 42, wherein the apparatus further comprises: means for in response to attachment of the terminal device to the network device, associating the control resource set with the terminal device; and means for adding an indication of the association of the control resource set and the terminal device in the record.

Example 45. the apparatus of example 44, wherein the apparatus further comprises: means for in response to detachment of the terminal device from the network device, remove the indication of the association of the control resource set and the terminal device from the record.

Example 46. the apparatus of example 42, wherein the record further indicates reusable control resources in the control resource set, and the apparatus further comprises means for updating the record by removing the localized control resources from the reusable control resources in the control resource set.

Example 47. the apparatus of example 46, wherein the apparatus further comprises: means for in response to completion of the transmission of the downlink data, updating the record by adding the localized control resources back to the reusable control resources in the control resource set.

Example 48. the apparatus of example 41, wherein the localized control resources comprise a plurality of continuous resource elements.

Example 49. the apparatus of example 48, wherein the plurality of continuous resource elements are selected starting from at least one of starting time and starting frequency of the control resource set.

Example 50. the apparatus of example 41, wherein the control resource set is allocated from starting time of the control resource region.

Example 51. the apparatus of example 41, wherein the control information is common control information, and the control resource set is a common control resource set allocated in response to cell setup.

Example 52. the apparatus of example 41, wherein the control information is control information specific to the terminal device, and the control resource set is a control resource set allocated to the terminal device in response to attachment of the terminal device to the network device.

Example 53. the apparatus of example 41, wherein the means for selecting the data resources comprises: means for selecting the data resources in the control resource set.

Example 54. the apparatus of example 41, wherein the means for selecting the data resources in the control resource set comprises: means for determining, based on at least one of a data type and a priority associated with the downlink data, whether the downlink data is allowed to be transmitted in the control resource set; and means for in response to determining that the downlink data is allowed to be transmitted in the control resource set, selecting the data resources in the control resource set.

Example 55. the apparatus of example 53 or 54, wherein a modulation and coding scheme is applied to both the control information and the downlink data.

Example 56. the apparatus of example 53 or 54, wherein first time duration of the control resources is the same as second time duration of the data resources, or a first frequency band of the control resources is the same as a second frequency band of the data resources.

Example 57. the apparatus of example 41, wherein the means for selecting the data resources comprises: means for selecting a default data resource block for the downlink data in both the control resource region and the data resource region, wherein resources in the default data resource block are more than the data resources; means for determining at least one skipped part of the default data resource block based on used resources in the default data resource block; and means for determining the data resources from the default data resource block by excluding the at least one skipped parts of the default data resource block.

Example 58. the apparatus of example 57, wherein the means for selecting the data resources from the default data resource block comprises: means for determining whether the number of skipped parts is below a threshold number; and means for in response to determining that the number of skipped resource blocks is below the threshold number, selecting the data resources from the default data resource block by excluding the at least one skipped parts of the default data resource block.

Example 59. the apparatus of example 57 or 58, wherein the apparatus further comprises: means for indicating the at least one skipped part of the default data resource block to the terminal device by dedicated control information specific to the terminal device.

Example 60. the apparatus of example 59, wherein the means for indicating the at least one skipped part of the default data resource block comprises: means for indicating at least one of frequency domain resource assignment and time domain resource assignment of the at least one skipped part of the default data resource block.

Example 61. a computer readable storage medium, comprising program instructions stored thereon, the instructions, when executed by a processor of a device, causing the device to perform the method of any of examples 21-40.

What is claimed is:

1. A device comprising:
   at least one processor; and
   at least one non-transitory memory storing instructions that when executed by the at least one processor, cause the device to:
   in response to downlink data to be transmitted to a terminal device, determine, at a network device, a control resource set associated with the terminal device in a control resource region;
   select, from the control resource set, localized control resources for control information associated with the downlink data;
   in response to determining, based on at least one of a data type or a priority associated with the downlink data, that the downlink data is allowed to be transmitted in the control resource set, select data resources for the downlink data in the control resource region and a data resource region;
   transmit the control information to the terminal device by using the localized control resources; and transmit the downlink data to the terminal device by using the data resources.

2. The device of claim 1, wherein the at least one non-transitory memory is storing instructions that when executed by the at least one processor cause the device to: determine the control resource set by: determining the control resource set by searching a database for a record indicating the association of the control resource set and the terminal device.

3. The device of claim 2, wherein the record is stored for the control resource set in the database.

4. The device of claim 2, wherein the at least one non-transitory memory is storing instructions that when executed by the at least one processor cause the device to: in response to attachment of the terminal device to the network device, associate the control resource set with the terminal device; and add an indication of the association of the control resource set and the terminal device in the record.

5. The device of claim 4, wherein the at least one non-transitory memory is storing instructions that when executed by the at least one processor cause the device to: in response to detachment of the terminal device from the network device, remove the indication of the association of the control resource set and the terminal device from the record.

6. The device of claim 2, wherein the record further indicates reusable control resources in the control resource set, and wherein the at least one non-transitory memory is storing instructions that when executed by the at least one processor cause the device to: update the record by removing the localized control resources from the reusable control resources in the control resource set.

7. The device of claim 6, wherein the at least one non-transitory memory is storing instructions that when executed by the at least one processor cause the device to: in response to completion of the transmission of the downlink data, update the record by adding the localized control resources back to the reusable control resources in the control resource set.

8. The device of claim 1, wherein the localized control resources comprise a plurality of continuous resource elements.

9. The device of claim 8, wherein the plurality of continuous resource elements are selected starting from at least one of starting time and starting frequency of the control resource set.

10. The device of claim 1, wherein the control resource set is allocated from starting time of the control resource region.

11. The device of claim 1, wherein the control information is common control information, and the control resource set is a common control resource set allocated in response to cell setup.

12. The device of claim 1, wherein the control information is control information specific to the terminal device, and the control resource set is a control resource set allocated to the terminal device in response to attachment of the terminal device to the network device.

13. The device of claim 1, wherein the at least one non-transitory memory is storing instructions that when executed by the at least one processor cause the device to: select the data resources by: selecting the data resources in the control resource set.

14. The device of claim 13, wherein a modulation and coding scheme is applied to both the control information and the downlink data.

15. The device of claim 13, wherein first time duration of the control resources is the same as second time duration of the data resources, or a first frequency band of the control resources is the same as a second frequency band of the data resources.

16. The device of claim 1, wherein the at least one non-transitory memory is storing instructions that when executed by the at least one processor cause the device to: select the data resources by: selecting a default data resource block for the downlink data in both the control resource region and the data resource region, wherein resources in the default data resource block are more than the data resources; determining at least one skipped part of the default data resource block based on used resources in the default data resource block; and determining the data resources from the default data resource block by excluding the at least one skipped parts of the default data resource block.

17. The device of claim 16, wherein the at least one non-transitory memory is storing instructions that when executed by the at least one processor cause the device to: select the data resources from the default data resource block by: determining whether the number of skipped parts is below a threshold number; and in response to determining that the number of skipped resource blocks is below the threshold number, selecting the data resources from the default data resource block by excluding the at least one skipped parts of the default data resource block.

18. The device of claim 16, wherein the at least one non-transitory memory is storing instructions that when executed by the at least one processor cause the device to: indicate the at least one skipped part of the default data resource block to the terminal device by dedicated control information specific to the terminal device.

19. A method comprising:
in response to downlink data to be transmitted to a terminal device, determining, at a network device, a control resource set associated with the terminal device in a control resource region;
selecting, from the control resource set, localized control resources for control information associated with the downlink data;
in response to determining, based on at least one of a data type or a priority associated with the downlink data, that the downlink data is allowed to be transmitted in the control resource set, selecting data resources for the downlink data in the control resource region and a data resource region; transmitting the control information to the terminal device by using the localized control resources; and
transmitting the downlink data to the terminal device by using the data resources.

* * * * *